(12) United States Patent
Funabashi et al.

(10) Patent No.: US 9,001,662 B2
(45) Date of Patent: Apr. 7, 2015

(54) CONTROL METHOD, CONTROL DEVICE, AND COMMUNICATION SYSTEM

(71) Applicant: Fujitsu Limited, Kawasaki-shi, Kanagawa (JP)

(72) Inventors: Ryoichi Funabashi, Kawasaki (JP); Ryuta Tanaka, Machida (JP); Atsuko Tada, Tokorozawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/293,037

(22) Filed: Jun. 2, 2014

(65) Prior Publication Data
US 2014/0362823 A1    Dec. 11, 2014

(30) Foreign Application Priority Data
Jun. 6, 2013    (JP) ................................. 2013-120271

(51) Int. Cl.
*H04L 1/00* (2006.01)
*H04W 36/32* (2009.01)
*H04W 36/00* (2009.01)
*G06F 15/16* (2006.01)

(52) U.S. Cl.
CPC .......... *H04W 36/32* (2013.01); *H04W 36/0022* (2013.01)

(58) Field of Classification Search
None
See application file for complete search history.

(56) References Cited

U.S. PATENT DOCUMENTS
2003/0065712 A1*    4/2003    Cheung et al. ................. 709/203

FOREIGN PATENT DOCUMENTS
JP    2011-525312    9/2011
WO    2009/142685    11/2009

* cited by examiner

*Primary Examiner* — Clemence Han
(74) *Attorney, Agent, or Firm* — Staas & Halsey LLP

(57) ABSTRACT

A control method includes: acquiring information that indicates a predicted position of a mobile terminal that requests data that is able to be received from a first communication device; identifying, based on the acquired information, a second communication device that is able to communicate with the mobile terminal located at the predicted position; and causing, by a processor, the second communication device to start receiving the data from the first communication device before the identified second communication device becomes able to communicate with the mobile terminal, and to transmit the received data to the mobile terminal after the second communication device becomes able to communicate with the mobile terminal.

14 Claims, 30 Drawing Sheets

| TIME t | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| X COORDINATE | 0 | 10 | 20 | 30 | 40 | 50 | 60 | 70 | 80 | 90 | 100 | 110 | 120 | 130 | 140 | 150 | 160 | 170 | 180 | 190 | 200 | 210 | 220 |

PREDICTED ROUTE INFORMATION 2100

FIG. 22

COMMUNICATION-ENABLED DEVICE TABLE 2200

| X COORDINATE | 0 | 10 | 20 | 30 | 40 | 50 | 60 | 70 | 80 | 90 | 100 | 110 | 120 | 130 | 140 | 150 | 160 | 170 | 180 | 190 | 200 | 210 | 220 |
|---|---|---|---|---|---|---|---|---|---|---|---|---|---|---|---|---|---|---|---|---|---|---|---|
| CANDIDATE DEVICE ID | - | - | - | C1 | - | - | - | - | - | - | - | - | - | C2 | C2 | C2, C3 | C3 | C3 | C3 | C3 | C3 | C3 | - |

FIG. 28

| | Mn | Man | Mbn |
|---|---|---|---|
| M1 | 5 | 5 | 5 |
| M2 | 24 | 24 | 24 |
| M3 | 11 | 20 | 11 |
| M4 | 12 | 30 | 12 |
| ΣMn | 52 | | |

| D1 | 4 |
|---|---|
| D2 | 18 |
| D3 | 8 |
| D4 | 9 |
| ΣDn | 40 |

| M=40 | | | | | | |
|---|---|---|---|---|---|---|
| | | Mn | Man | Mbn | | |
| | M1 | 0 | 5 | 0 | D1 | 0 |
| | M2 | 24 | 24 | 24 | D2 | 20 |
| | M3 | 12 | 20 | 12 | D3 | 10 |
| | M4 | 12 | 30 | 12 | D4 | 10 |
| | ΣMn | 48 | | | ΣDn | 40 |

2911, 2912

CONTROL METHOD, CONTROL DEVICE, AND COMMUNICATION SYSTEM

CROSS-REFERENCE TO RELATED APPLICATION

This application is based upon and claims the benefit of priority of the prior Japanese Patent Application No. 2013-120271, filed on Jun. 6, 2013, the entire contents of which are incorporated herein by reference.

FIELD

The embodiments discussed herein are related to a control method, a control device, and a communication system.

BACKGROUND

In order to download a large amount of data such as video data from a file server to a mobile terminal, there is a demand to maintain a stable, high-speed network connection between the mobile terminal and a base station. However, if a communication rate in a network is not sufficient or communication is not executed in the network due to a restriction caused by congestion, a disease, or the like or due to the fact that the mobile terminal is located outside a communication area, it takes a lot of time to download the data or the data is not downloaded. In addition, a technique in which a mobile network communicates data requests to neighboring data stores and the neighboring data stores pre-fetch the data is known (refer to, for example, Japanese National Publication of International Patent Application No. 2011-525312).

In addition, since the amounts of traffic in communication carriers' lines for mobile terminals increase, there is a demand to take an off-load measure to cause traffic to travel to lines and the like other than the carriers' lines. For the measure, there is a method for accessing a file server through a wireless-fidelity (Wi-Fi) (registered trademark) access point that is able to be connected to mobile terminals. This method is referred to as Wi-Fi off-load and promoted in order to distribute traffic to base stations of carriers. In addition, an ad-hoc network technique for forming an autonomous network by causing mobile terminals to directly communicate with each other is known.

SUMMARY

According to an aspect of the invention, a control method includes: acquiring information that indicates a predicted position of a mobile terminal that requests data that is able to be received from a first communication device; identifying, based on the acquired information, a second communication device that is able to communicate with the mobile terminal located at the predicted position; causing, by a processor, the second communication device to start receiving the data from the first communication device before the identified second communication device becomes able to communicate with the mobile terminal, and to transmit the received data to the mobile terminal after the second communication device becomes able to communicate with the mobile terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 22 is diagram illustrating an example of a communication-enabled device table;

FIG. 28 is a diagram illustrating an example of calculation of amounts of data according to the second embodiment; and FIG. 29 is a diagram illustrating an example of calculation of amounts of the data according to the third and fourth embodiments.

DESCRIPTION OF EMBODIMENTS

Embodiments of a control method, a control device, and a communication system that are disclosed herein are described in detail with reference to the accompanying drawings.

While inventing the present embodiments, observations were made regarding a related art. Such observations include the following, for example.

In a communication system of the related art, the aforementioned techniques have a problem that if data requested by a certain mobile terminal is received by another terminal or the like and transmitted by the other terminal or the like to the certain mobile terminal, and a data receive rate of the request receiving terminal or the like is low, it is difficult to improve a receive rate of the requesting mobile terminal.

According to an aspect, an object of the embodiments is to provide a control method, a control device, and a communication system that improve a receive rate.

First Embodiment

Communication System According to First Embodiment

Figure 1A:
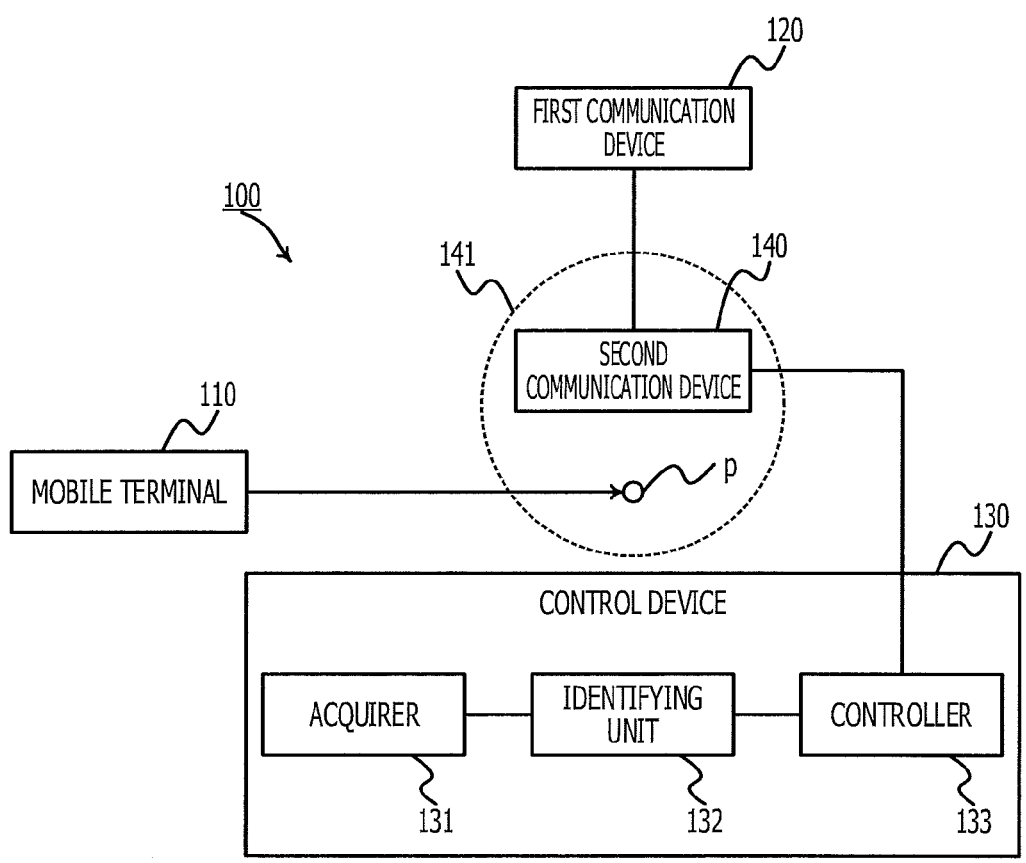
FIG. 1A is a diagram illustrating an example of a communication system according to a first embodiment.
Figure 1B:
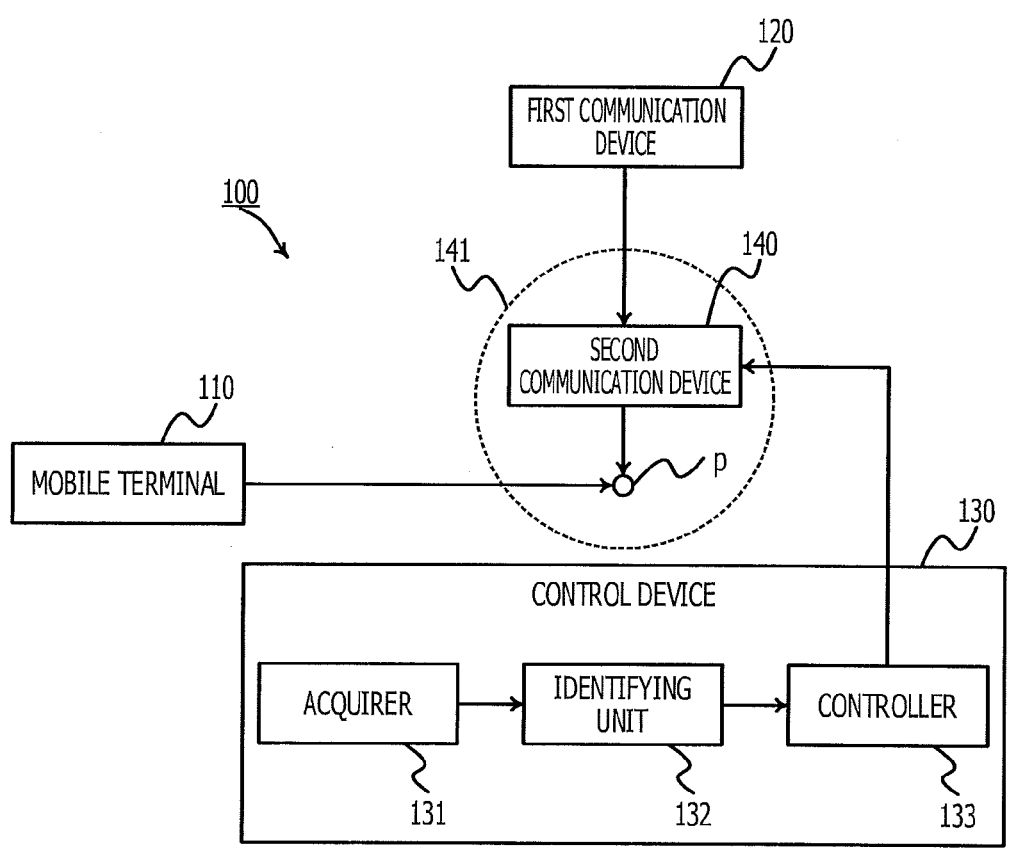
FIG. 1B is a diagram illustrating an example of flows of signals in the communication system illustrated in FIG. 1A.

FIG. 1A is a diagram illustrating an example of a communication system according to a first embodiment. FIG. 1B is a diagram illustrating an example of flows of signals in the communication system illustrated in FIG. 1A. As illustrated in FIGS. 1A and 1B, the communication system 100 according to the first embodiment includes a mobile terminal 110, a first communication device 120, a control device 130, and a second communication device 140. The mobile terminal 110 requests data that is able to be received from the first communication device 120.

The control device 130 is a server device or mobile terminal that is able to communicate with the mobile terminal 110. The control device 130 includes an acquirer 131, an identifying unit 132, and a controller 133. The acquirer 131 acquires, from the mobile terminal 110, predicted position information that indicates a future predicted position p of the mobile terminal 110. The predicted position information may indicate the predicted position p at a single time or predicted positions p of the mobile terminal 110 at a plurality of times. The acquirer 131 outputs the acquired predicted position information to the identifying unit 132.

The identifying unit 132 identifies, based on the predicted position information output from the acquirer 131, the second communication device 140 that is able to wirelessly communicate with the mobile terminal 110 located at the predicted position p. The second communication device 140 receives data from the first communication device 120. A communication range 141 is a communication range for the mobile terminal 110, while the second communication device 140 is able to wirelessly communicate with the mobile terminal 110 in the communication range 141. Specifically, when the mobile terminal 110 enters in the communication range 141, the second communication device 140 becomes able to directly wirelessly communicate with the mobile terminal 110.

For example, the identifying unit 132 identifies the second communication range 140 from among a plurality of communication devices based on communication range information indicating communication ranges in which the plurality of communication devices that are able to be connected to the first communication device 120 and are candidates for the second communication device 140 are able to communicate with the mobile terminal 110. The identifying unit 132 notifies the controller 133 of the identified second communication device 140.

The controller 133 transmits a control signal to the second communication device 140 notified by the identifying unit 132 and thereby controls the second communication device 140, for example. Before the second communication device 140 becomes able to communicate with the mobile terminal 110 in response to a movement of the mobile terminal 110, the controller 133 causes the second communication device 140 to start receiving data from the first communication device 120, for example. After the second communication device 140 becomes able to communicate with the mobile terminal 110 in response to the movement of the mobile terminal 110, the controller 133 causes the second communication device 140 to wirelessly transmit the data received by the second communication device 140 to the mobile terminal 110.

In this manner, the control device 130 identifies the second communication device 140 that is able to communicate with the mobile terminal 110 located at the predicted position p, and the control device 130 requests the second communication device 140 to start receiving the data requested by the mobile terminal 110 before the mobile terminal 110 approaches the second communication device 140. Thus, even if a rate of receiving data by the second communication device 140 from the first communication device 120 is low, the data may be transferred from the second communication device 140 to the mobile terminal 110 with a short delay. Thus, a data receive rate of the mobile terminal 110 may be improved.

Assignments of Reception by Second Communication Devices

The identifying unit 132 may identify a plurality of second communication devices 140 that are able to communicate with the mobile terminal 110 located at the predicted position p. In this case, the controller 133 assigns the plurality of second communication devices 140 to receive the data requested by the mobile terminal 110. Then, the controller 133 causes the plurality of second communication devices 140 to wirelessly transmit the received data to the mobile terminal 110.

Thus, the amount of data to be received by a single communication device 140 from the first communication device 120 and wirelessly transmitted by the single second communication device 140 to the mobile terminal 110 may be reduced. Even if the size of the data requested by the mobile terminal 110 is large, a process may be distributed to the plurality of second communication devices 140, and loads of the second communication devices 140 may be reduced. In addition, a time period in which data is able to be transmitted from the second communication devices 140 to the mobile terminal 110 may be increased by using the plurality of second communication devices 140. Thus, data with a large size may be received by the mobile terminal 110.

Determination of Assignments of Reception Based on Predicted Capacities Between Second Communication Devices and Mobile Terminal If reception of data is assigned to a plurality of second communication devices 140, the controller 133 may determine parts of the data requested by the mobile terminal 110 and to be received by the plurality of second communication devices 140 (or determine assignments of the reception).

For example, the controller 133 determines the assignments of the reception to the plurality of second communication devices 140 based on predicted capacity information that indicates predicted capacities of the second communication devices 140 for data that is able to be transmitted to the mobile terminal 110 within a time period in which the second communication devices 140 is able to communicate with the mobile terminal 110. For example, the larger a predicted capacity, indicated by the predicted capacity information, of a second communication device 140, the larger the amount of data to be assigned by the controller 133 and received by the second communication device 140. Thus, the controller 133 may assign the second communication devices 140 to receive data in amounts that the data is able to be transmitted by the second communication devices 140 to the mobile terminal 110.

The predicted capacity information may be calculated based on predicted time information and predicted rate information, for example. The predicted time information indicates predicted time periods in which the plurality of second communication devices 140 are able to communicate with the first communication device 120. The predicted rate information indicates predicted rates of communication between the plurality of second communication devices 140 and the first communication device 120.

The predicted time information may be calculated based on predicted route information and communication range information, for example. The predicted route information indicates predicted positions of the mobile terminal 110 at a plurality of times. The communication range information indicates the communication ranges in which the second communication devices 140 are able to communicate with the mobile terminal 110. The control device 130 may receive the predicted route information from the mobile terminal 110, and thus the acquirer 131 may acquire the predicted route information, for example. The control device 130 may receive the communication range information from the second communication devices 140, and thus the acquirer 131 may acquire the communication range information, for example.

The predicted rate information may be obtained based on history records of communication between the first communication device 120 and the second communication devices 140, the strength of radio waves, existing at the predicted positions p, of the second communication devices 140, and the like.

Determination of Assignments of Reception based on Predicted Capacities between First Communication Device and Second Communication Devices The controller 133 may determine the assignments of the reception of the data to the second communication devices 140 based on predicted capacity information that indicates predicted capacities of the second communication devices 140 for the data to be received from the first communication device 120 before the second communication devices 140 become able to communicate with the mobile terminal 110. For example, the larger a predicted capacity, indicated by the predicted capacity information, of a second communication device 140, the larger the amount of data to be assigned by the controller 133 and received by the second communication device 140. Thus, the controller 133 may assign the second communication devices 140 to receive data in amounts that the data is able to be received from the first communication device 120 before the second communication devices 140 become able to communicate with the mobile terminal 110.

For example, the controller 133 calculates the predicted capacity information based on predicted time information and predicted rate information. In this case, the predicted time information indicates predicted time periods until the plurality of second communication devices 140 become able to communicate with the first communication device 120, and the predicted rate information indicates predicted rates of communication between the plurality of second communication devices 140 and the first communication device 120.

The predicted time information may be calculated based on the predicted route information and the communication range information. In this case, the predicted route information indicates predicted positions of the mobile terminal 110 at a plurality of times, and the communication range information indicates the communication ranges in which the second communication devices 140 are able to communicate with the mobile terminal 110, for example. The control device 130 may receive the predicted route information from the mobile terminal 110, and thus the acquirer 131 may acquire the predicted route information, for example.

The predicted rate information may be obtained based on a test result of communication between the first communication device 120 and the second communication devices 140 and history records of communication between the first communication device 120 and the second communication devices 140.

The second communication devices 140 may receive data from the first communication device 120 and transmit the data to the mobile terminal 110 simultaneously. In this case, the controller 133 may assign the second communication devices 140 to receive the data with a larger amount than a predicted capacity for receiving data from the first communication device 120 before the second communication devices 140 become able to communicate with the mobile terminal 110.

Modified Example

The examples illustrated in FIGS. 1A and 1B describe the case where the control device 130 is able to communicate with the mobile terminal 110. The control device 130 may be installed in the mobile terminal 110. In this case, the control device 130 may enable the mobile terminal 110 to perform network communication through a base station and may control the second communication devices 140 through a communication device that is able to wirelessly communicate with the mobile terminal 110 and the second communication devices 140.

In addition, the control device 130 may be divided into a plurality of communication devices so that the acquirer 131 and the identifying unit 132 that are included in one of the communication devices are able to communicate with the controller 133 included in the other communication device.

Second Embodiment

Communication System According to Second Embodiment

Figure 2:
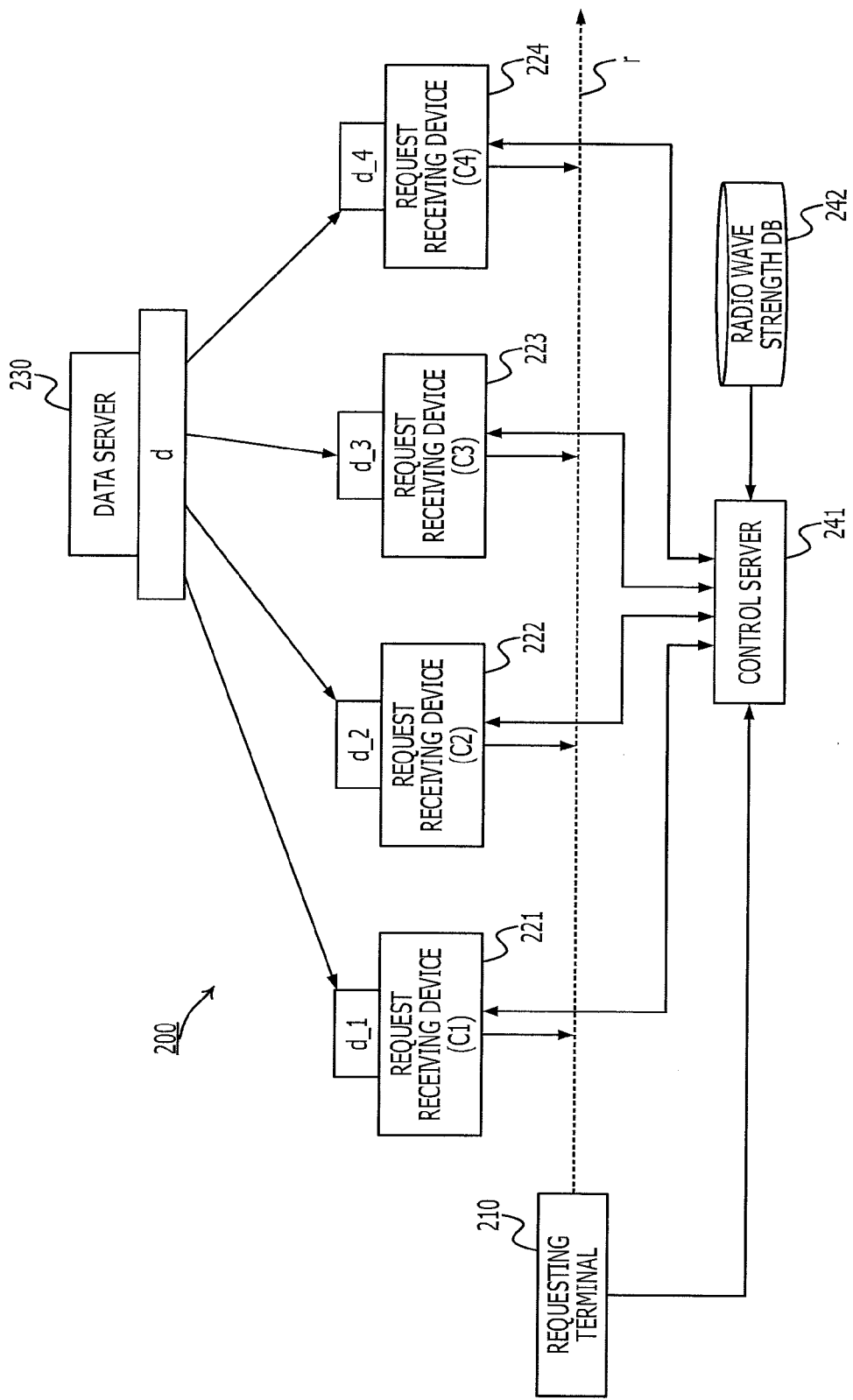
FIG. 2 is a diagram illustrating an example of a communication system according to a second embodiment.

FIG. 2 is a diagram illustrating an example of a communication system according to a second embodiment. As illustrated in FIG. 2, a communication system 200 according to the second embodiment includes a requesting terminal 210, request receiving terminals 221 to 224 (C1 to C4), a data server 230, a control server 241, and a radio wave strength database (DB) 242.

The mobile terminal 110 illustrated in FIGS. 1A and 1B may be achieved by the requesting terminal 210, for example. The first communication device 120 illustrated in FIGS. 1A and 1B may be achieved by the data server 230, for example. The control device 130 illustrated in FIGS. 1A and 1B may be achieved by the control server 241 and the radio wave strength DB 242, for example. The second communication devices 140 described with reference to FIGS. 1A and 1B may be achieved by the request receiving devices 221 to 224, for example.

The requesting terminal 210 is a mobile terminal that requests data d that is able to be received from the data server 230. A predicted route r is a predicted route of the requesting terminal 210. The requesting terminal 210 transmits, to the control server 241, a signal requesting the control server 241 to pre-fetch the data d if the data d is large for a communication band between the data server 230 and the requesting terminal 210.

The data server 230 downloads the data d in response to the request. The data server 230 has a function (for example, a resume function) of downloading a part of the data d in response to the request, for example.

The control server 241 is a device that is able to communicate with the requesting terminal 210. For example, the control server 241 is connected to a network such as the Internet and able to communicate with the requesting terminal 210 through the network and a base station that wirelessly communicates with the requesting terminal 210. The control server 241 is able to access the radio wave strength DB 242.

When receiving the request signal from the requesting terminal 210, the control server 241 searches the radio wave strength DB 242 and identifies the request receiving devices 221 to 224 that are located near the predicted route r and predicted to become able to wirelessly communicate with the requesting terminal 210 in the future.

The request receiving devices 221 to 224 are communication devices that are able to access the data server 230 and wirelessly communicate with the requesting terminal 210 when the requesting terminal 210 approaches the request receiving devices 221 to 224. In addition, the request receiving devices 221 to 224 receive data from the data server 230 under control of the control server 241 and each have a storage unit (for example, a RAM 812 illustrated in FIG. 8A or a nonvolatile memory 813 illustrated in FIG. 8A) for caching the received data.

For example, the request receiving devices 221 to 224 are mobile terminals that are able to be connected to the data server 230 through a base station and wirelessly communicate with the requesting terminal 210 by ad-hoc communication. Alternatively, the request receiving devices 221 to 224 may be wireless local area network (WLAN) access points that are able to be connected to the data server 230 through the Internet or the like and wirelessly communicate with the requesting terminal 210. Alternatively, at least one of the request receiving devices 221 to 224 may be a mobile terminal, and at least one of the request receiving devices 221 to 224 may be an access point.

The radio wave strength DB 242 is a database that is accessible from the controller 241. The radio wave strength DB 242 stores information that indicates communication ranges of communication devices including the request receiving devices 221 to 224. If the communication devices are fixed to specific positions or are WLAN access points or the like, the communication ranges of the communication devices may be measured by measuring the strength of radio waves, for example.

If the communication devices are mobile terminals, the communication ranges of the communication devices may be measured by periodically acquiring the positions of the communication devices and radio waves. In this case, the positions of the communication devices and the radio waves may be periodically acquired by an application distributed to the communication devices.

The control server 241 assigns the identified request receiving devices 221 to 224 to receive the data d of the data server 230. Data parts $d\_1$ to $d\_4$ are parts obtained by dividing the data d and are assigned to and received by the request receiving devices 221 to 224, respectively.

The request receiving devices 221 to 224 start receiving the data parts $d\_1$ to $d\_4$ from the data server 230 under control of the control server 241 before the request receiving devices 221 to 224 become able to wirelessly communicate with the requesting terminal 210 in response to a movement of the requesting terminal 210. Then, when the request receiving devices 221 to 224 become able to wirelessly communicate with the requesting terminal 210 in response to the movement of the requesting terminal 210, the request receiving devices 221 to 224 wirelessly transmit the received data parts $d\_1$ to $d\_4$ to the requesting terminal 210, respectively. Thus, the requesting terminal 210 receives the data parts $d\_1$ to $d\_4$ and synthesizes the data parts $d\_1$ to $d\_4$ so as to acquire the data d.

Operations of Communication System According to Second Embodiment

Figure 3:
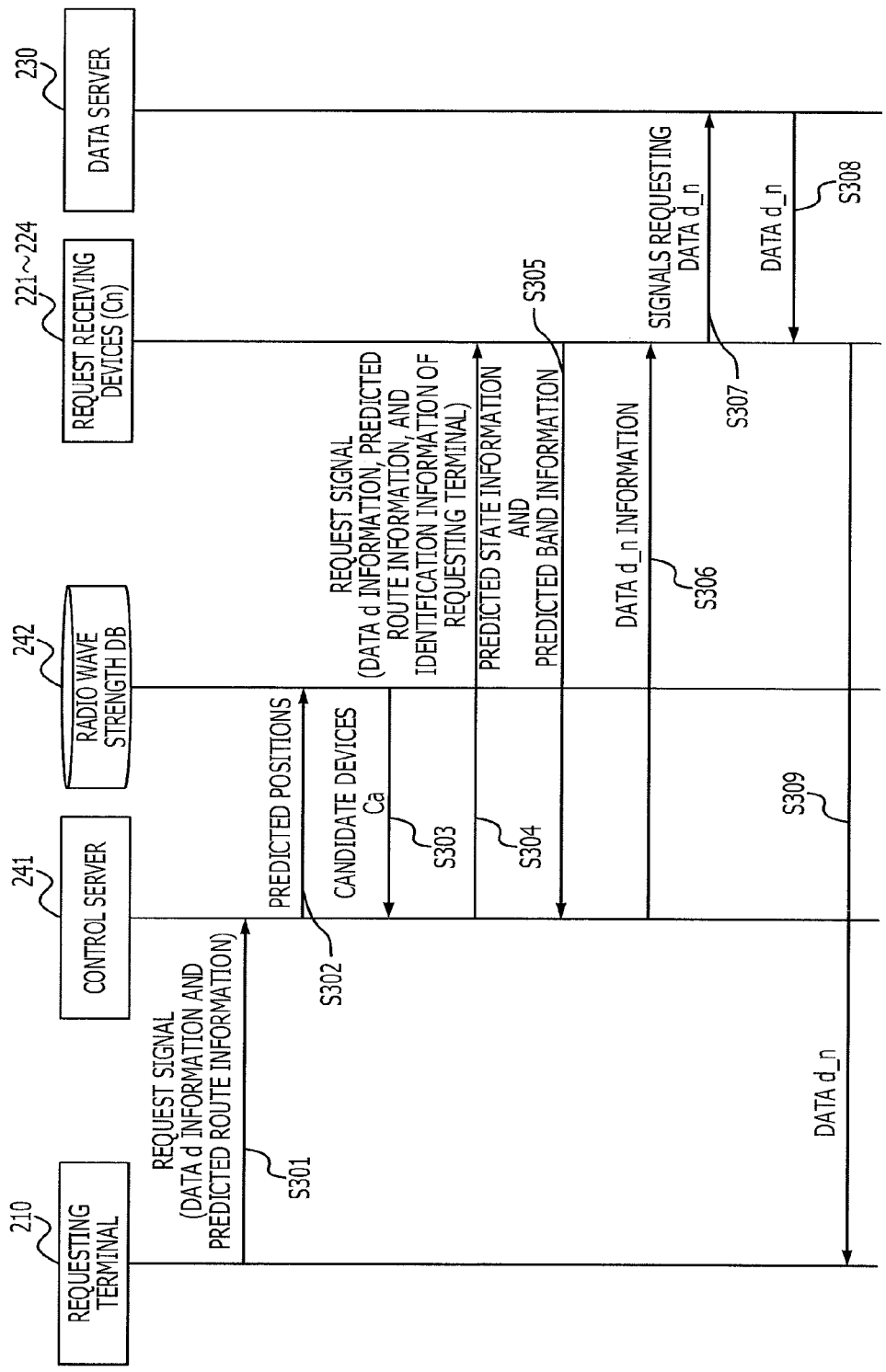
FIG. 3 is a sequence diagram illustrating an example of operations of the communication system according to the second embodiment.

FIG. 3 is a sequence diagram illustrating an example of operations of the communication system according to the second embodiment. When a request to receive the data d is provided in the requesting terminal 210, the requesting terminal 210 transmits a request signal to the control server 241 (in step S301). The request signal transmitted in step S301 includes data d information indicating how the data d is acquired and predicted route information indicating the predicted route r of the requesting terminal 210.

The data d information is a uniform resource locator (URL) of the data d or the like. The predicted route information indicates predicted positions (for example, positional coordinates) of the requesting terminal 210 at future times t. The predicted route information may be acquired from a navigation system that uses a global positioning system (GPS) of the requesting terminal 210. Alternatively, the predicted route information may be acquired from schedule information (combinations of locations and times and dates), stored in the requesting terminal 210, of a user of the requesting terminal 210 or the like.

Next, the control server 241 notifies the radio wave strength DB 242 of the predicted positions of the requesting terminal 210 (in step S302), while the predicted positions of the requesting terminal 210 are indicated by the predicted route information included in the request signal transmitted in step S301. Then, the radio wave strength DB 242 notifies the control server 241 of candidate devices Ca that are located near the predicted positions notified in step S302 and able to be connected to the data server 230 (in step S303).

Next, the control server 241 selects, from among the candidate devices Ca notified in step S303, request receiving devices Cn (for example, the request receiving devices 221 to 224) to be requested to be assigned to receive the data d. Then, the control server 241 transmits a request signal to the selected request receiving devices Cn (in step S304). The request signal transmitted in step S304 includes the data d information included in the request signal transmitted in step S301, the predicted route information included in the request signal transmitted in step S301, and identification information of the requesting terminal 210. The identification information of the requesting terminal 210 is a media access control (MAC) address of the requesting terminal 210 or the like, for example.

Next, the request receiving devices Cn transmit, to the control server 241, predicted state information and predicted band information (in step S305). The predicted state information and the predicted band information are based on the data d information and the predicted route information that are included in the request signal transmitted in step S304.

The predicted state information indicates predicted states (for example, predicted positions and predicted speeds) of the request receiving devices Cn (refer to, for example, FIG. 25), for example. The predicted state information may be acquired by the request receiving devices Cn in advance, for example.

The predicted band information indicates predicted bands between the data server 230 and the request receiving devices Cn. For example, the predicted band information may be acquired by causing each of the request receiving devices Cn to carry out a test to receive the data from the data server 230 based on the data d information. Alternatively, the predicted band information may be calculated from history records of communication executed between the request receiving devices Cn and the data server 230 in the past.

Next, the control server 241 determines, based on the predicted state information transmitted in step S305 and the predicted band information transmitted in step S305, data d_n to be accumulated by the request receiving devices Cn. Then, the control server 241 transmits data d_n information indicating the determined data d_n to the request receiving devices Cn (in step S306). For example, the control server 241 transmits, to the request receiving device 221 (C1), data d_1 information indicating data d_1 to be accumulated by the request receiving device 221 (C1).

Next, the request receiving devices Cn transmit, to the data server 230, signals requesting the data d_n indicated by the data d_n information transmitted in step S306 (in step S307). For example, the request receiving device 221 (C1) transmits, to the data server 230, a signal requesting the data d_1 indicated by the data d_1 information. Next, the data server 230 transmits, to the request receiving devices Cn, the data d_n corresponding to the request signals transmitted in step S307 (in step S308). For example, the data server 230 transmits the data d_1 to the request receiving device 221 (C1).

Next, the request receiving devices Cn wait until the request receiving devices Cn become able to communicate with the requesting terminal 210 based on the identification information, included in the request signal transmitted in step S304, of the requesting terminal 210. Then, when the request receiving devices Cn become able to communicate with the requesting terminal 210, the request receiving devices Cn transmit, to the requesting terminal 210, the data d_n transmitted in step S308 (in step S309). For example, the request receiving device 221 (C1) transmits the data d_1 to the requesting terminal 210 when the request receiving device 221 (C1) becomes able to communicate with the requesting terminal 210.

Feedback Process

For example, a route of the requesting terminal 210 may deviate from the predicted route r when the user of the requesting terminal 210 changes the route or when a time period in which data passes through the route changes due to congestion or the like. In this case, the requesting terminal 210 transmits predicted route information indicating a new predicted route r, and steps illustrated in FIG. 3 are executed. Thus, the change of the predicted route r may be fed back, and the data d may be received by the request receiving devices 221 to 224 predicted to be able to communicate with the requesting terminal 210 in the future.

Process of Requesting Terminal According to Second Embodiment

Figure 4:
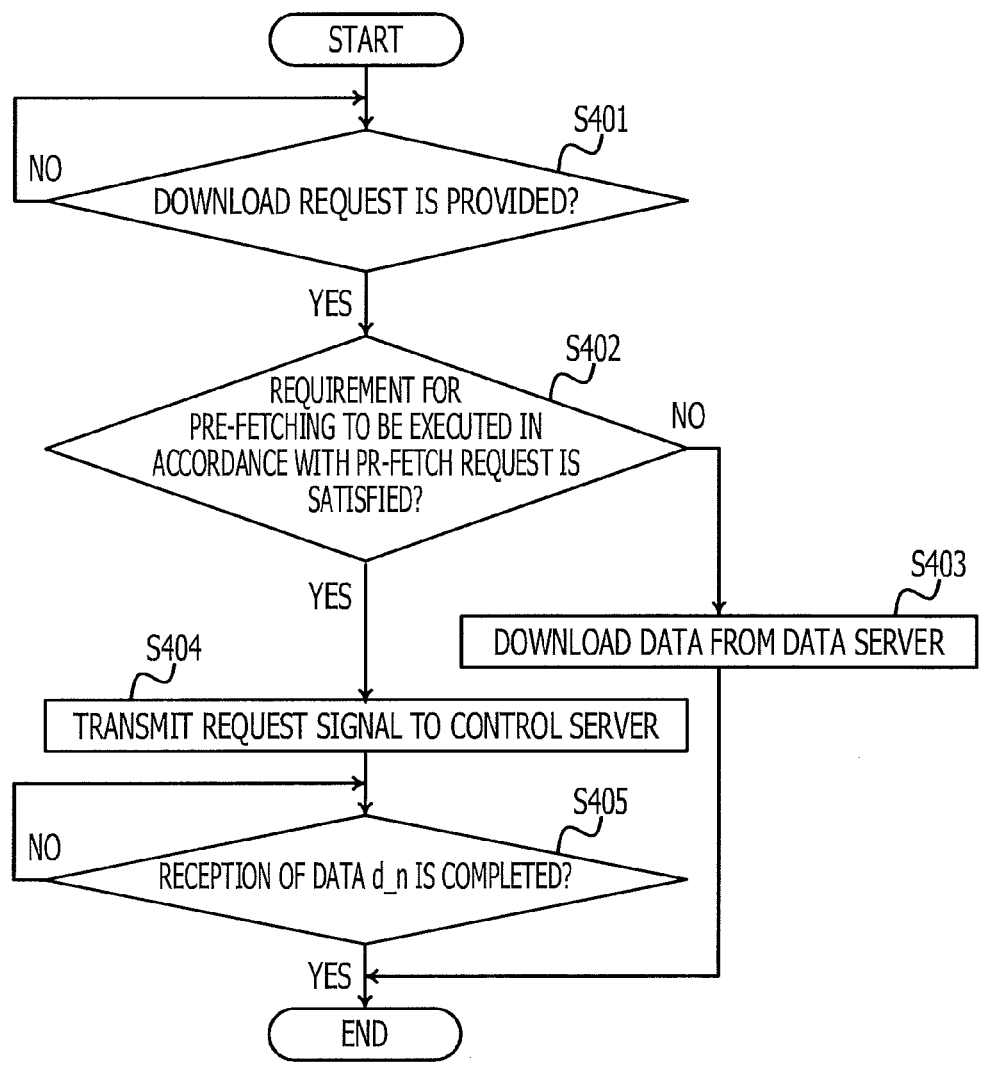
FIG. 4 is a flowchart of an example of a process to be executed by a requesting terminal according to the second embodiment.

FIG. 4 is a flowchart of an example of a process to be executed by the requesting terminal according to the second embodiment. The requesting terminal 210 according to the second embodiment executes steps illustrated in FIG. 4, for example. First, the requesting terminal 210 determines whether or not a request to download the data d stored in the data server 230 is provided in the requesting terminal 210 (in step S401). The requesting terminal 210 waits until the download request is provided (No in step S401).

If the download request is provided (Yes in step S401), the requesting terminal 210 determines whether or not downloading to be executed in accordance with the download request satisfies a requirement for pre-fetching to be executed in accordance with the pre-fetch request (in step S402). The requirement for pre-fetching to be executed in accordance with the pre-fetch request is that the size of the data d requested to be downloaded is larger than a predetermined size, for example. The predetermined size may be a size corresponding to a communication band between the requesting terminal 210 and the data server 230, for example. Alternatively, the requirement for pre-fetching to be executed in accordance with the pre-fetch request may be that the communication band between the requesting terminal 210 and the data server 230 is less than a predetermined band.

If the requirement for pre-fetching to be executed in accordance with the pre-fetch request is not satisfied (No in step S402), the requesting terminal 210 downloads the data d corresponding to the download request from the data server 230 (in step S403) and terminates the process. The data d may be downloaded through a base station currently connected to the requesting terminal 210 or the like in step S403.

If the requirement for pre-fetching to be executed in accordance with the pre-fetch request is satisfied (Yes in step S402), the requesting terminal 210 transmits, to the control server 241, a request signal indicating a request to receive the data d pre-fetched (in step S404). The request signal transmitted in step S404 includes the data d information indicating how the data d is acquired and the predicted route information indicating the predicted route r of the requesting terminal 210.

Next, the requesting terminal 210 determines whether or not the requesting terminal 210 completely receives the data d_n from the other communication devices located near the movement route of the requesting terminal 210 (in step S405). The requesting terminal 210 waits until the requesting terminal 210 completely receives the data d_n (No in step S405). If the number of communication devices requested to receive the data d_n pre-fetched is 1, the data d_n is the data d. If the number of communication devices requested to receive the data d_n pre-fetched is 2 or more, the data d_n is data parts obtained by dividing the data d.

If the requesting terminal 210 has completely received the data d_n (Yes in step S405), the requesting terminal 210 terminates the process. If the requesting terminal 210 does not completely receive the data d_n within a certain time period in step S405, the requesting terminal 210 may retransmit the request signal to the control server 241 or download the data d corresponding to the download request from the data server 230.

Process of Control Server According to Second Embodiment

Figure 5:
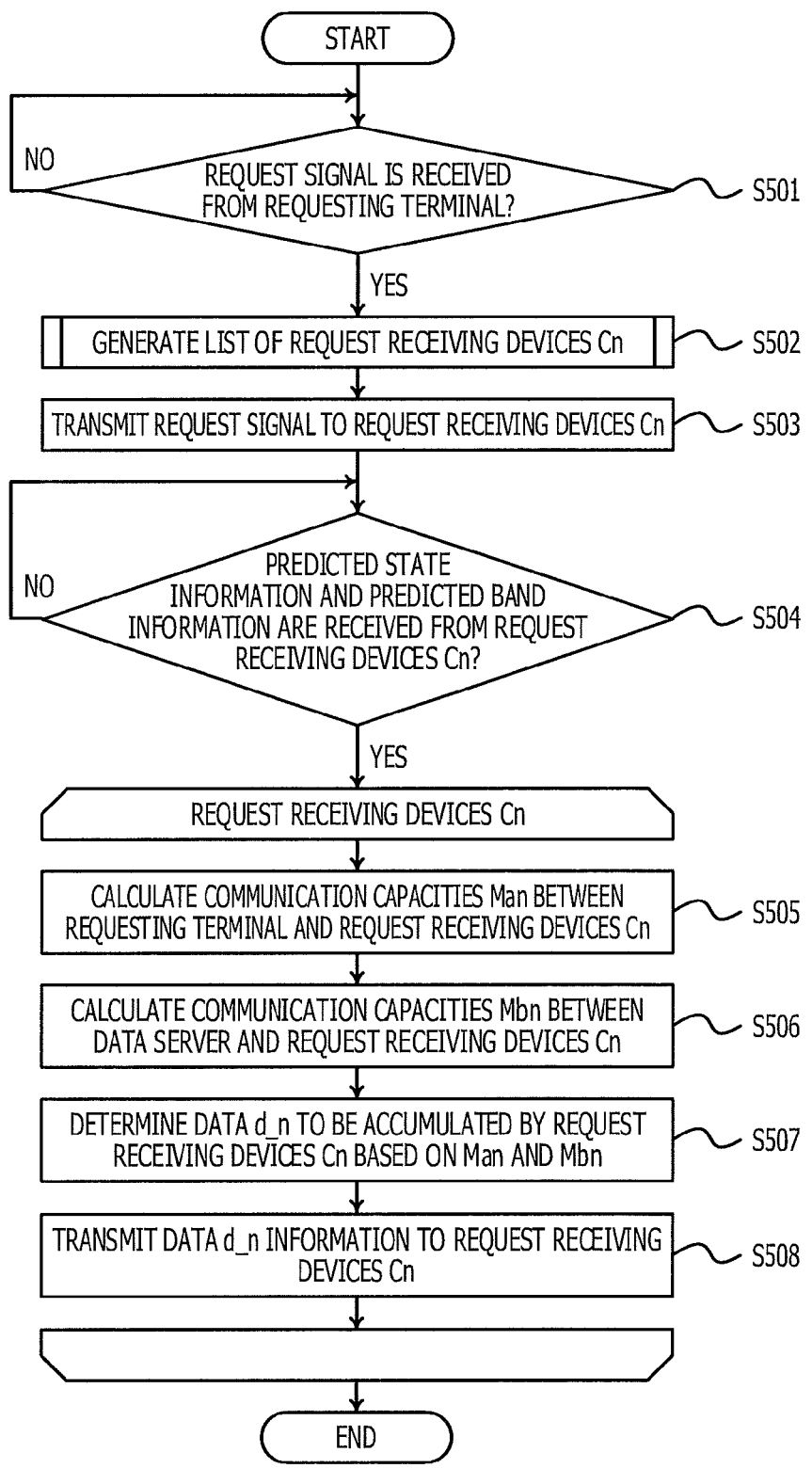
FIG. 5 is a flowchart of an example of a process to be executed by a control server according to the second embodiment.

FIG. 5 is a flowchart of an example of a process to be executed by the control server according to the second embodiment. The control server 241 according to the second embodiment executes steps illustrated in FIG. 5, for example. First, the control server 241 determines whether or not the control server 241 receives the request signal from the requesting terminal 210 (in step S501). The control server 241 waits until the control server 241 receives the request signal (No in step S501). When receiving the request signal (Yes in step S501), the control server 241 generates a list of the request receiving devices Cn based on the predicted route information included in the request signal (in step S502). A process of generating the list of the request receiving devices Cn in step S502 is described later (refer to, for example, FIG. 6).

Next, the control server 241 transmits the request signal to the request receiving devices Cn indicated in the list generated in step S502 (in step S503). The request signal transmitted in step S503 includes the data d information included in the request signal received in step S501, the predicted route information included in the request signal received in step S501, and the identification information of the requesting terminal 210.

Next, the control server 241 determines whether or not the control server 241 receives the predicted state information and the predicted band information from the request receiving devices Cn (in step S504). The control server 241 waits until the control server 241 receives the predicted state information and the predicted band information (No in step S504). When receiving the predicted state information and the predicted band information (Yes in step S504), the control server 241 executes the following steps S505 to S508 on the request receiving devices Cn indicated in the list generated in step S502.

The control server 241 calculates communication capacities Man between the requesting terminal 210 and the target request receiving devices Cn based on the predicted state information and the predicted band information that have been received from the target request receiving devices Cn in step S504 (in step S505).

The control server 241 calculates communication capacities Mbn between the data server 230 and the target request receiving devices Cn based on the predicted state information and the predicted band information that have been received in step S504 (in step S506). Note that step S506 may be executed before step S505.

Next, the control server 241 determines, based on the communication capacities Man and Mbn calculated in steps S505 and S506, the data d_n to be accumulated by the target request receiving devices Cn (in step S507). Then, the control server 241 transmits, to the target request receiving devices Cn, the data d_n information indicating the data d_n determined in step S507 (in step S508) and terminates the process executed on the target request receiving devices Cn.

After steps S505 to S508 are executed on the request receiving devices Cn indicated in the list generated in step S502, the control server 241 terminates the process.

Process of Generating List of Request Receiving Devices Cn

Figure 6:
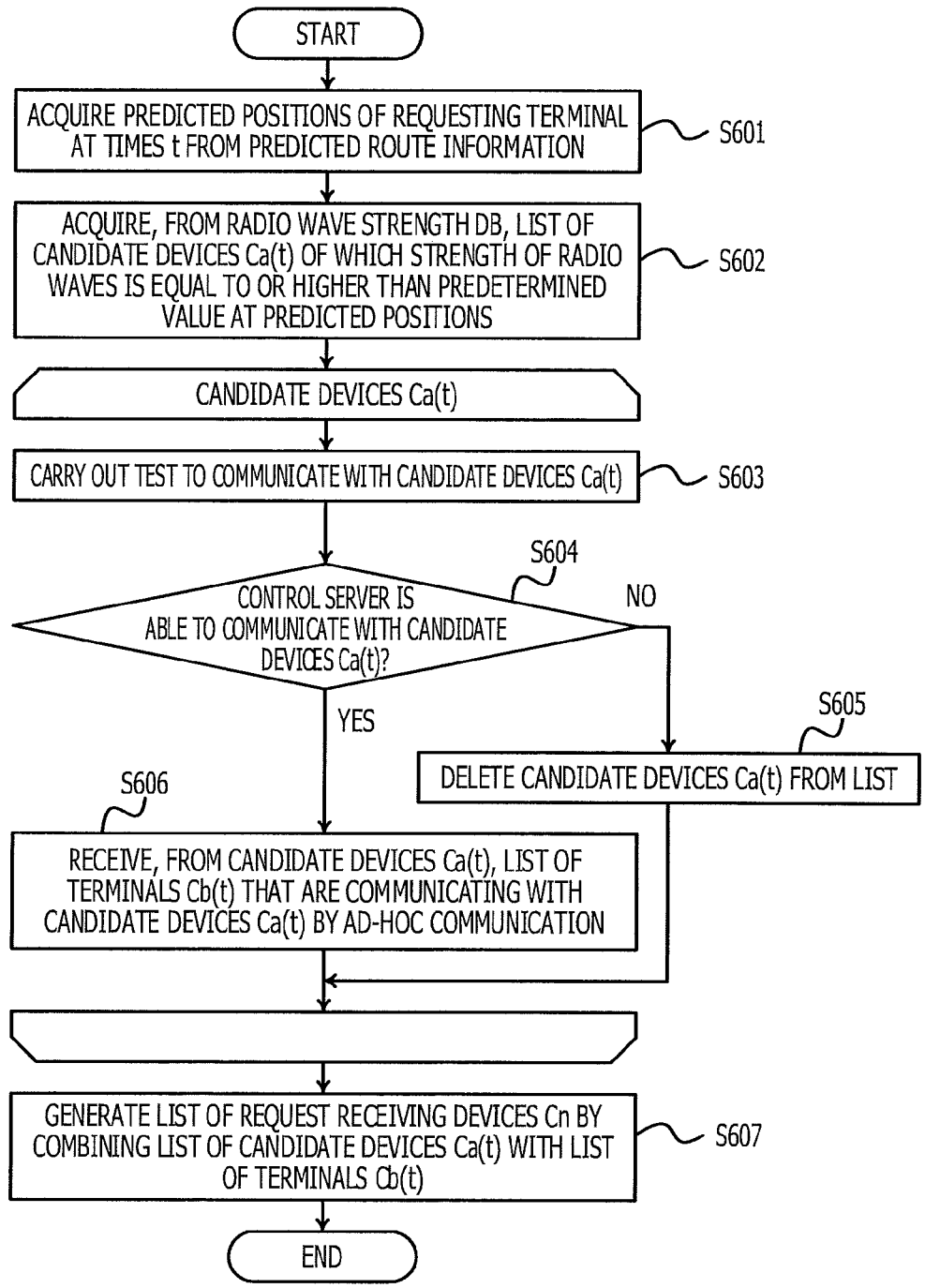
FIG. 6 is a flowchart of an example of a process of generating a list of request receiving devices.

FIG. 6 is a flowchart of an example of the process of generating the list of the request receiving devices Cn. In step S502 illustrated in FIG. 5, the control server 241 generates the list of the request receiving devices Cn by executing the following steps. First, the control server 241 acquires predicted positions of the requesting terminal 210 at the times t from the predicted route information received from the requesting terminal 210 (in step S601).

Next, the control server 241 acquires, from the radio wave strength DB 242, a list of candidate devices Ca(t) of which the strength of radio waves is equal to or higher than a predetermined value at the predicted positions acquired in step S601 (in step S602). Then, the control server 241 executes the following steps S603 to S606 on the candidate devices Ca(t) indicated in the list acquired in step S602.

The control server 241 carries out a test to communicate with the target candidate devices Ca(t) (in step S603). Then, the control server 241 determines, based on results of the test carried out in step S603, whether or not the control server 241 is able to communicate with the target candidate devices Ca(t) (in step S604). If the control server 241 is not able to communicate with the candidate devices Ca(t) (No in step S604), the control server 241 deletes the target candidate devices Ca(t) from the list of the candidate devices Ca(t) (in step S605) and terminates the process executed on the target candidate devices Ca(t).

If the control server 241 is able to communicate with the candidate devices Ca(t) (Yes in step S604), the control server 241 receives, from the target candidate devices Ca(t), a list of terminals Cb(t) currently communicating with the target candidate devices Ca(t) by ad-hoc communication (in step S606) and terminates the process executed on the target candidate devices Ca(t).

After executing steps S603 to S606 on the target candidate devices Ca(t), the control server 241 causes the process to proceed to step S607. Specifically, the control server 241 generates the list of the request receiving devices Cn by combining the list of the candidate devices Ca(t) at the times t with the list of the terminals Cb(t) at the times (t) (in step S607) and terminates the process.

In step S607, the control server 241 may generate the list of the request receiving devices Cn by deleting overlapping candidate terminals from a result obtained by combining the lists. Before step S607, the control server 241 may carry out a test to communicate with the candidate devices Ca(t) indicated in the list of the candidate devices Ca(t) and delete, from the list of the candidate devices Ca(t), a candidate device Ca(t) that is not able to communicate with the control server 241.

Process of Request Receiving Devices According to Second Embodiment

Figure 7:
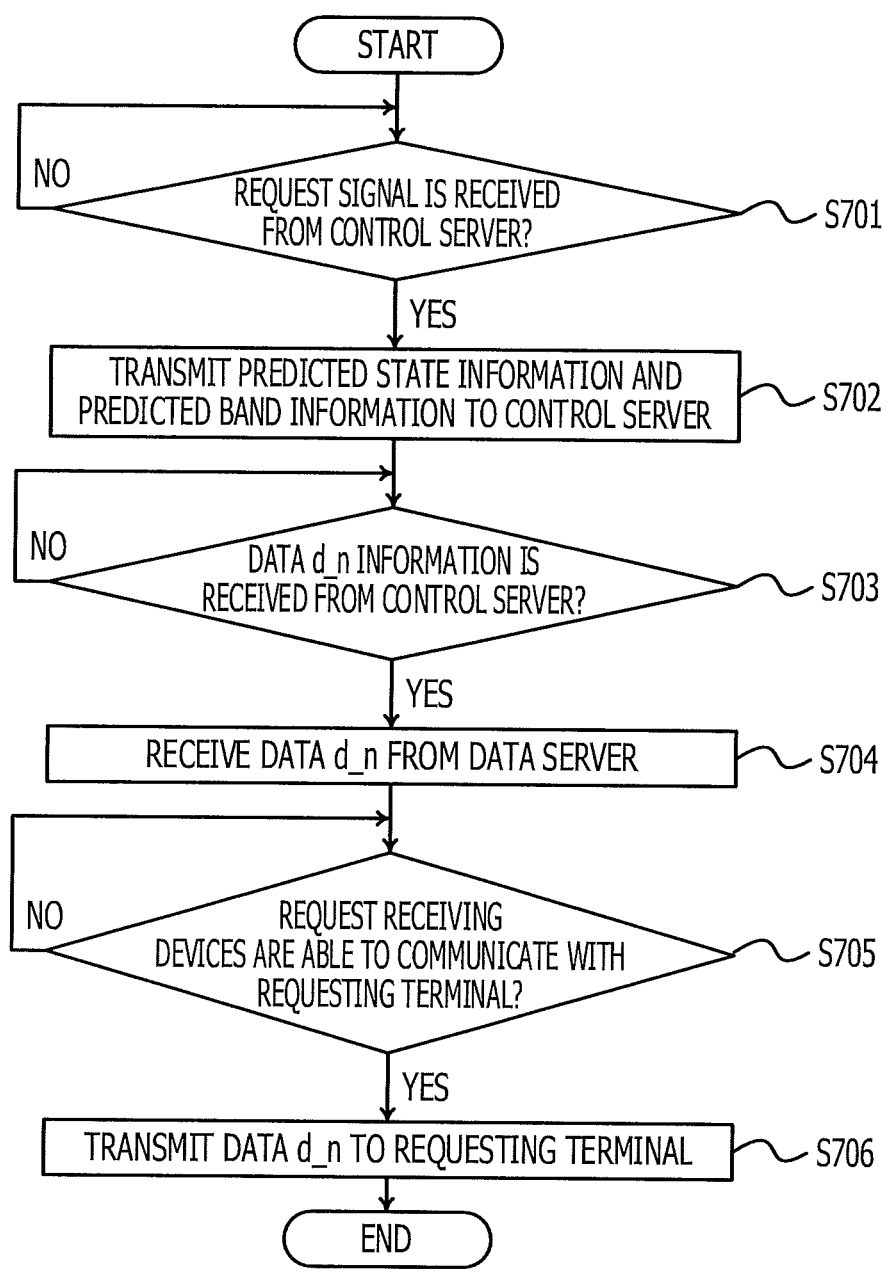
FIG. 7 is a flowchart of an example of a process to be executed by each of the request receiving devices according to the second embodiment.

FIG. 7 is a flowchart of an example of a process to be executed by each of the request receiving devices according to the second embodiment. The request receiving devices Cn (request receiving devices 221 to 224) each execute steps illustrated in FIG. 7, for example. First, the request receiving devices Cn determine whether or not the request receiving devices Cn receive a request signal from the control server 241 (in step S701). The request receiving devices Cn wait until the request receiving devices Cn receive the request signal (No in step S701).

When receiving the request signal (Yes in step S701), the request receiving devices Cn transmit, to the control server 241, predicted state information and predicted band information that are based on predicted route information included in the request signal received (in step S702). Then, the request receiving devices Cn determine whether or not the request receiving devices Cn receive the data d_n information from the control server 241 (in step S703.) The request receiving devices Cn wait until the request receiving devices Cn receive the data d_n information (No in step S703).

When receiving the data d_n information (Yes in step S703), the request receiving devices Cn receive, from the data server 230, the data d_n indicated by the data d_n information received (in step S704). Then, the request receiving devices Cn determine, based on the identification information of the requesting terminal 210, whether or not the request receiving devices Cn become able to communicate with the requesting terminal 210 (in step S705), while the identification information of the requesting terminal 210 is included in the request signal received by the request receiving devices Cn. The request receiving devices Cn wait until the request receiving devices Cn become able to communicate with the requesting terminal 210 (No in step S705).

When the request receiving devices Cn become able to communicate with the requesting terminal 210 (Yes in step S705), the request receiving devices Cn transmit the data d_n received in step S704 to the requesting terminal 210 (in step S706) and terminates the process.

Hardware Configurations of Terminals

Figure 8A:
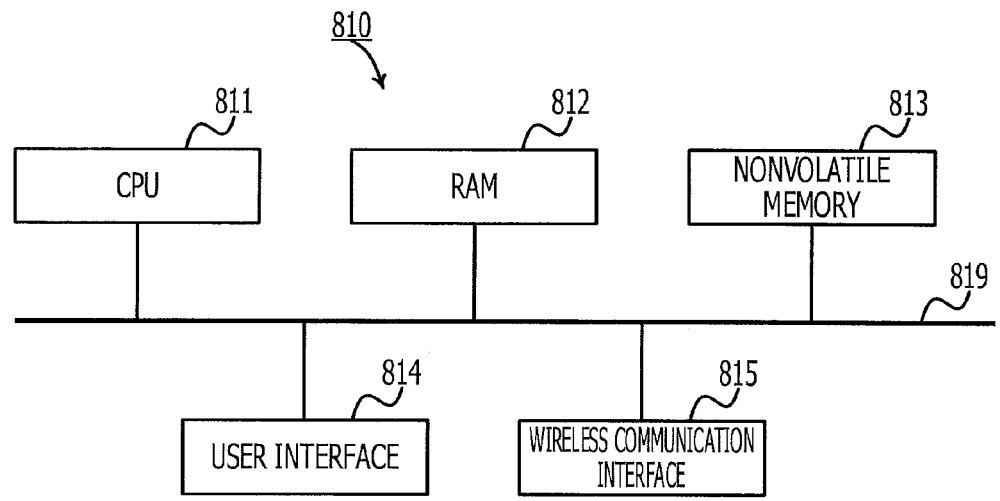
FIG. 8A is a diagram illustrating an example of a hardware configuration of a terminal.

FIG. 8A is a diagram illustrating an example of a hardware configuration of a terminal. The requesting terminal 210 and a mobile terminal among the request receiving devices 221 to 224 may be each achieved by a communication device 810 illustrated in FIG. 8A. The communication device 810 includes a central processing unit (CPU) 811, a random access memory (RAM) 812, a nonvolatile memory 813, a user interface 814, and a wireless communication interface 815. The CPU 811, the RAM 812, the nonvolatile memory 813, the user interface 814, and the wireless communication interface 815 are connected to each other by a bus 819.

The CPU 811 controls the overall communication device 810. The RAM 812 is used as a work area of the CPU 811. The nonvolatile memory 813 is, for example, a magnetic disk, an optical disc, a flash memory, or the like. The nonvolatile memory 813 stores various programs to be used to operate the communication device 810. The programs stored in the nonvolatile memory 813 are loaded into the RAM 812 and executed by the CPU 811.

The user interface 814 includes an input device for receiving an operational entry from a user and an output device for outputting information to the user. The input device may be achieved by keys (for example, a keyboard), a remote controller, or the like, for example. The output device may be achieved by a display, a speaker, or the like, for example. The input device and the output device may be achieved by a touch panel or the like. The user interface 814 is controlled by the CPU 811.

The wireless communication interface 815 is a communication interface that wirelessly communicates with externals (such as a base station, a WLAN access point, and another mobile terminal) of the communication device 810. The wireless communication interface 815 is controlled by the CPU 811.

Hardware Configuration of Control Server or Access Point

Figure 8B:
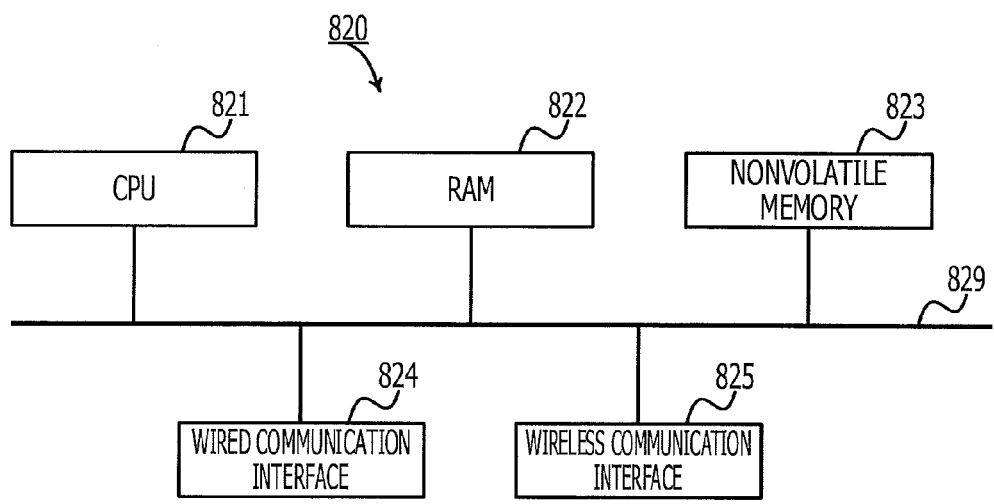
FIG. 8B is a diagram illustrating an example of a hardware configuration of the control server or an access point.

FIG. 8B is a diagram illustrating an example of a hardware configuration of the control server or an access point. The control server 241 and a WAN access point among the request receiving devices 221 to 224 may be each achieved by a communication device 820 illustrated in FIG. 8B, for example. The communication device 820 includes a CPU 821, a RAM 822, a nonvolatile memory 823, a wired communication interface 824, and a wireless communication interface 825. The CPU 821, the RAM 822, the nonvolatile memory 823, the wired communication interface 824, and the wireless communication interface 825 are connected to each other by a bus 829.

The CPU 821 controls the overall communication device 820. The RAM 822 is used as a work area of the CPU 821. The nonvolatile memory 823 is, for example, a magnetic disk, an optical disc, a flash memory, or the like. The nonvolatile memory 823 stores various programs to be used to operate the communication device 820. The programs stored in the nonvolatile memory 823 are loaded into the RAM 822 and executed by the CPU 821.

The wired communication interface 824 is a communication interface that communicates with an external (for example, the Internet) of the communication device 820 through a cable or the like. The wired communication interface 824 is controlled by the CPU 821.

The wireless communication interface 825 is a communication interface that wirelessly communicates with an external (for example, a mobile terminal) of the communication device 820. The wireless communication interface 825 is controlled by the CPU 821.

The acquirer 131 illustrated in FIGS. 1A and 1B may be achieved by the wired communication interface 824 or the wireless communication interface 825, for example. The identifying unit 132 illustrated in FIGS. 1A and 1B may be achieved by the CPU 821, for example. The controller 133 illustrated in FIGS. 1A and 1B may be achieved by the wired communication interface 824 or the wireless communication interface 825, for example.

In the aforementioned manner, the control server 241 according to the second embodiment identifies the request receiving devices 221 to 224 that are able to communicate with the requesting terminal 210 on the predicted route r of the requesting terminal 210. Then, the control server 241 requests the request receiving devices 221 to 224 to start receiving data requested by the requesting terminal 210 before the mobile terminal 110 approaches any of the request receiving devices 221 to 224. Thus, even if a rate of receiving data by the first communication device 120 from the request receiving devices 221 to 224 is low, the request receiving devices 221 to 224 may transfer the data to the requesting terminal 210 with a small delay. Thus, a data receive rate of the requesting terminal 210 may be improved.

Third Embodiment

Differences between the second embodiment and a third embodiment are described below.

Communication System According to Third Embodiment

Figure 9:
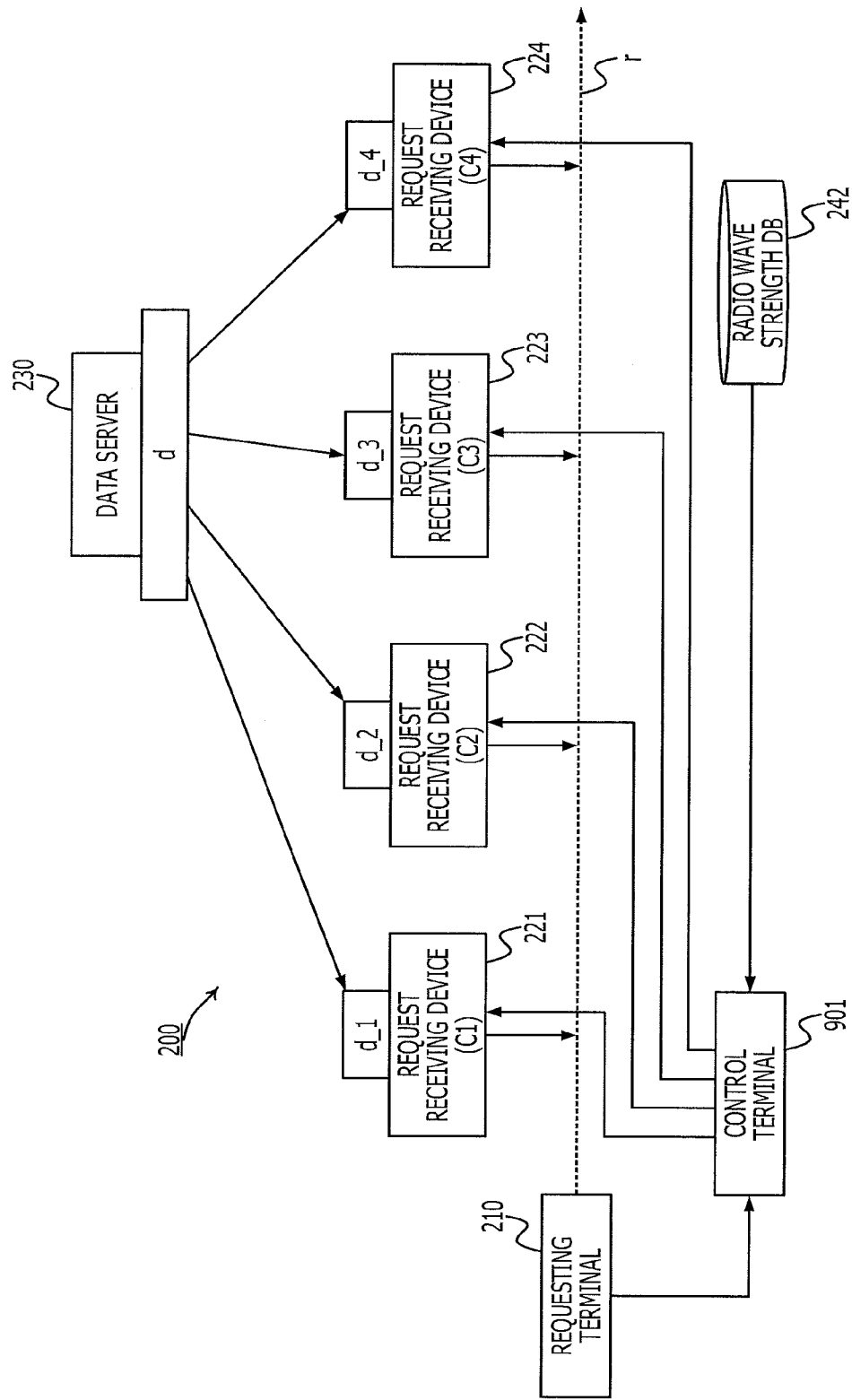
FIG. 9 is a diagram illustrating an example of a communication system according to a third embodiment.

FIG. 9 is a diagram illustrating an example of a communication system according to the third embodiment. As illustrated in FIG. 9, a communication system 200 according to the third embodiment has the configuration illustrated in FIG. 2, but includes a control terminal 901 instead of the control server 241. The control terminal 901 may be achieved by the communication device 810 illustrated in FIG. 8A, for example. The requesting terminal 210 transmits, to the control terminal 901, a request signal that indicates a request to receive the data d pre-fetched.

The control terminal 901 is a mobile terminal that is able to wirelessly communicate with the requesting terminal 210. For example, the control terminal 901 is the mobile terminal that first becomes able to wirelessly communicate with the requesting terminal 210 among mobile terminals that become able to wirelessly communicate with the requesting terminal 210 after the request to download the data d is provided in the requesting terminal 210. In addition, the control terminal 901 is able to access the radio wave strength DB 242. The control terminal 901 operates in the same manner as the control server 241 illustrated in FIG. 2.

Operations of Communication System According to Third Embodiment

Figure 10:
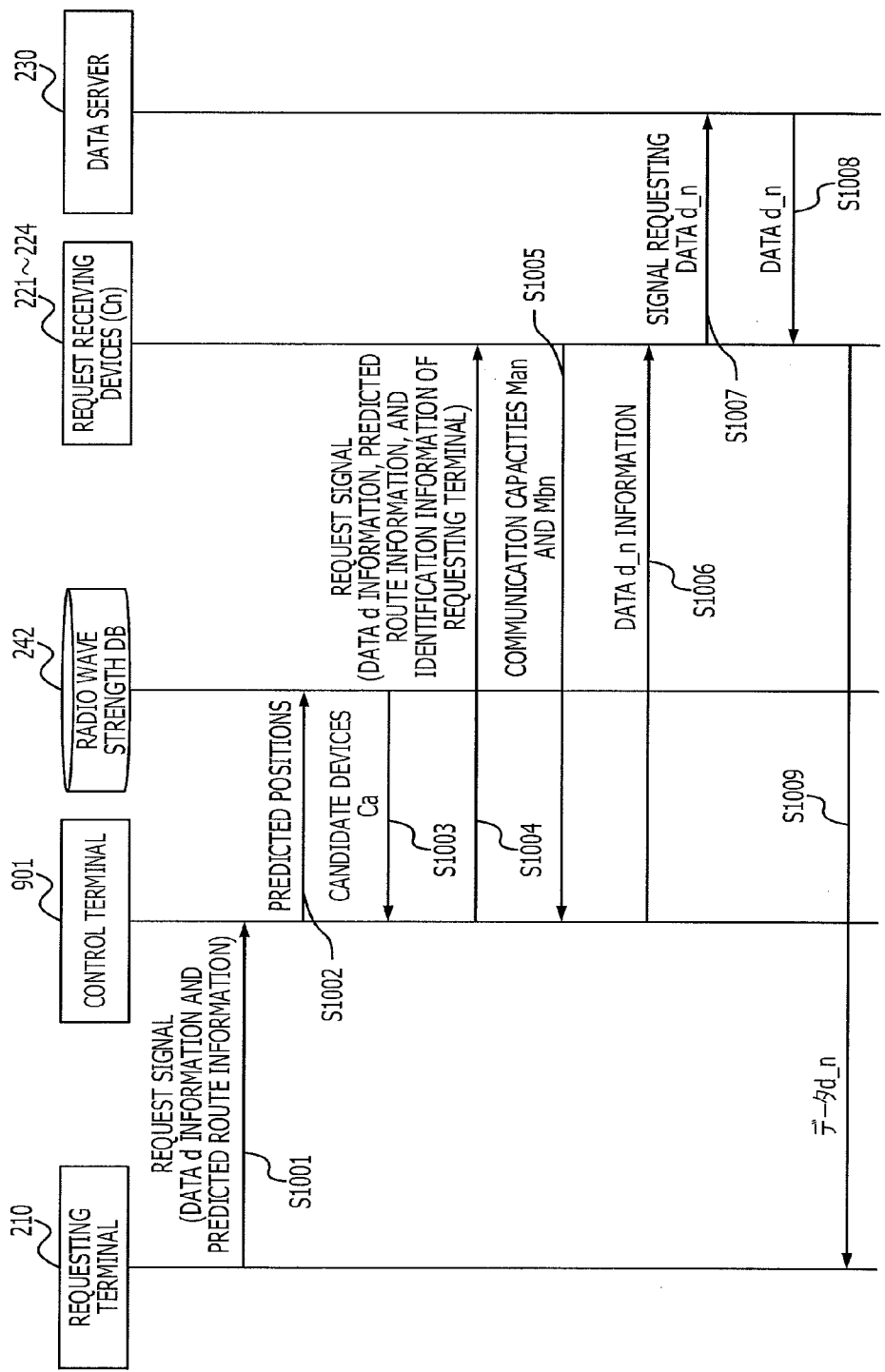
FIG. 10 is a sequence diagram illustrating an example of operations of the communication system according to the third embodiment.

FIG. 10 is a sequence diagram illustrating an example of operations of the communication system according to the third embodiment. When a request to receive the data d is provided in the requesting terminal 210, the requesting terminal 210 transmits a request signal to the control terminal 901 (in step S1001).

Then, the control terminal 901 notifies the radio wave strength DB 242 of predicted positions of the requesting terminal 210 (in step S1002), while the predicted positions are indicated by predicted route information included in the request signal transmitted in step S1001. Then, the radio wave strength DB 242 notifies the control terminal 901 of candidate devices Ca that are located near the predicted positions notified in step S1002 and able to be connected to the data server 230 (in step S1003).

Subsequently, the control terminal 901 selects, from among the candidate devices Ca notified in step S1003, request receiving devices Cn (for example, the request receiving devices 221 to 224) to be requested to be assigned to receive the data d. Then, the control terminal 901 transmits a request signal to the selected request receiving devices Cn (in step S1004). The request receiving devices Cn transmit, to the control terminal 901, communication capacities Man and Mbn that are based on the predicted route information included in the request signal transmitted in step S1004 (in step S1005).

Then, the control terminal 901 determines the data d_n to be accumulated by the request receiving devices Cn based on the communication capacities Man and Mbn transmitted in step S1005. The control terminal 901 transmits the data d_n information indicating the determined data d_n to the request receiving devices Cn (in step S1006). Steps S1007 to S1009 are the same as steps S307 to S309 illustrated in FIG. 3.

The request receiving devices Cn may each include the control terminal 901 and execute the aforementioned steps. Since the control terminal 901 is not already able to communicate with the requesting terminal 210, the amount of data that is able to be received from the data server 230 before the control terminal 901 becomes able to communicate with the requesting terminal 201 is 0. Thus, if the data d_n is determined based on the amount of the data before the request receiving devices Cn become able to communicate with the requesting terminal 210, data to be assigned to and received by the control terminal 901 does not exist.

Process of Requesting Terminal According to Third Embodiment

Figure 11:
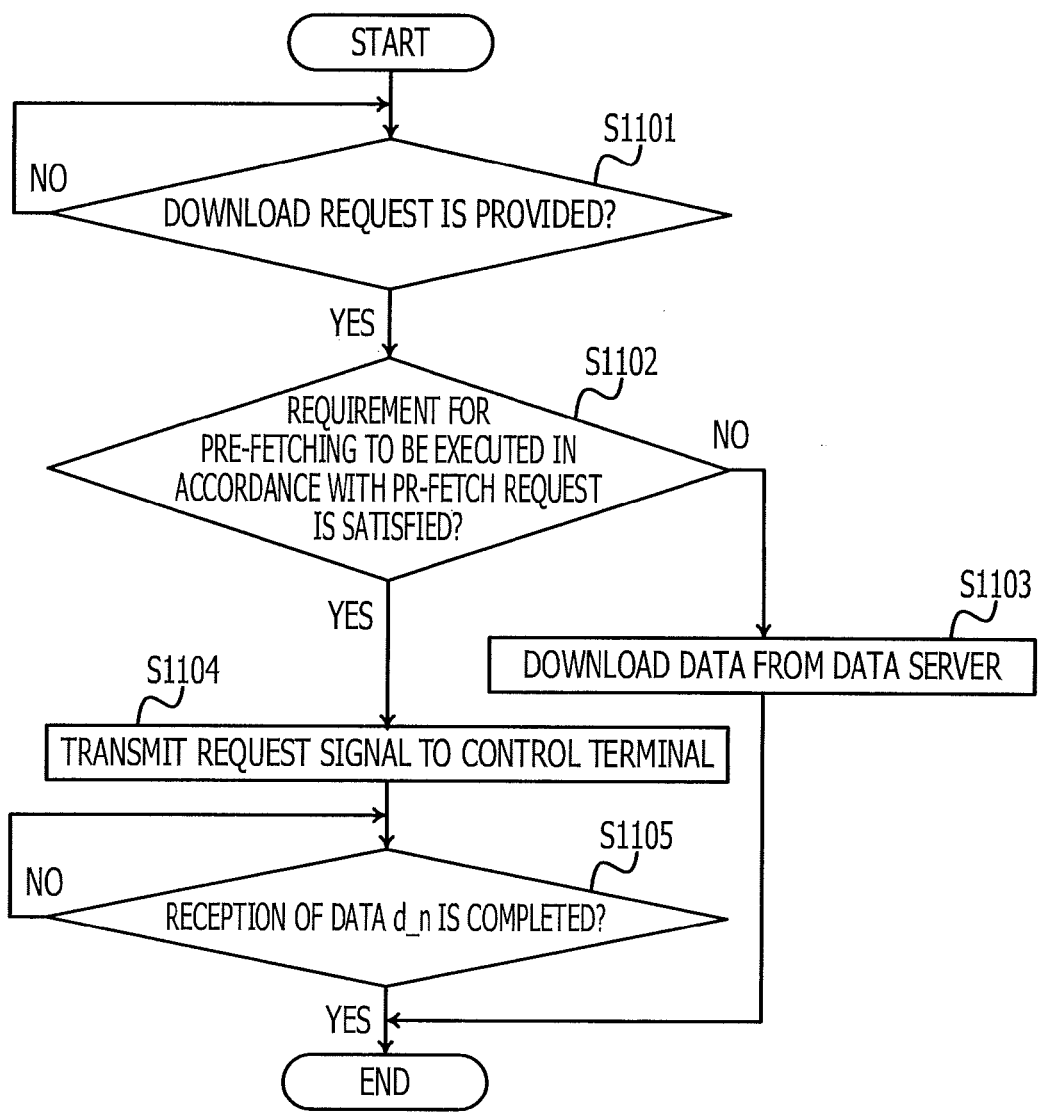
FIG. 11 is a flowchart of an example of a process to be executed by the requesting terminal according to the third embodiment.

FIG. 11 is a flowchart of an example of a process to be executed by the requesting terminal according to the third embodiment. The requesting terminal 210 according to the third embodiment executes steps illustrated in FIG. 11, for example. Steps S1101 to S1105 illustrated in FIG. 11 are the same as steps S401 to S405 illustrated in FIG. 4. However, the requesting terminal 210 transmits, to the control terminal 901, a request signal indicating a request to receive data pre-fetched (in step S1104).

Process of Control Terminal According to Third Embodiment

Figure 12:
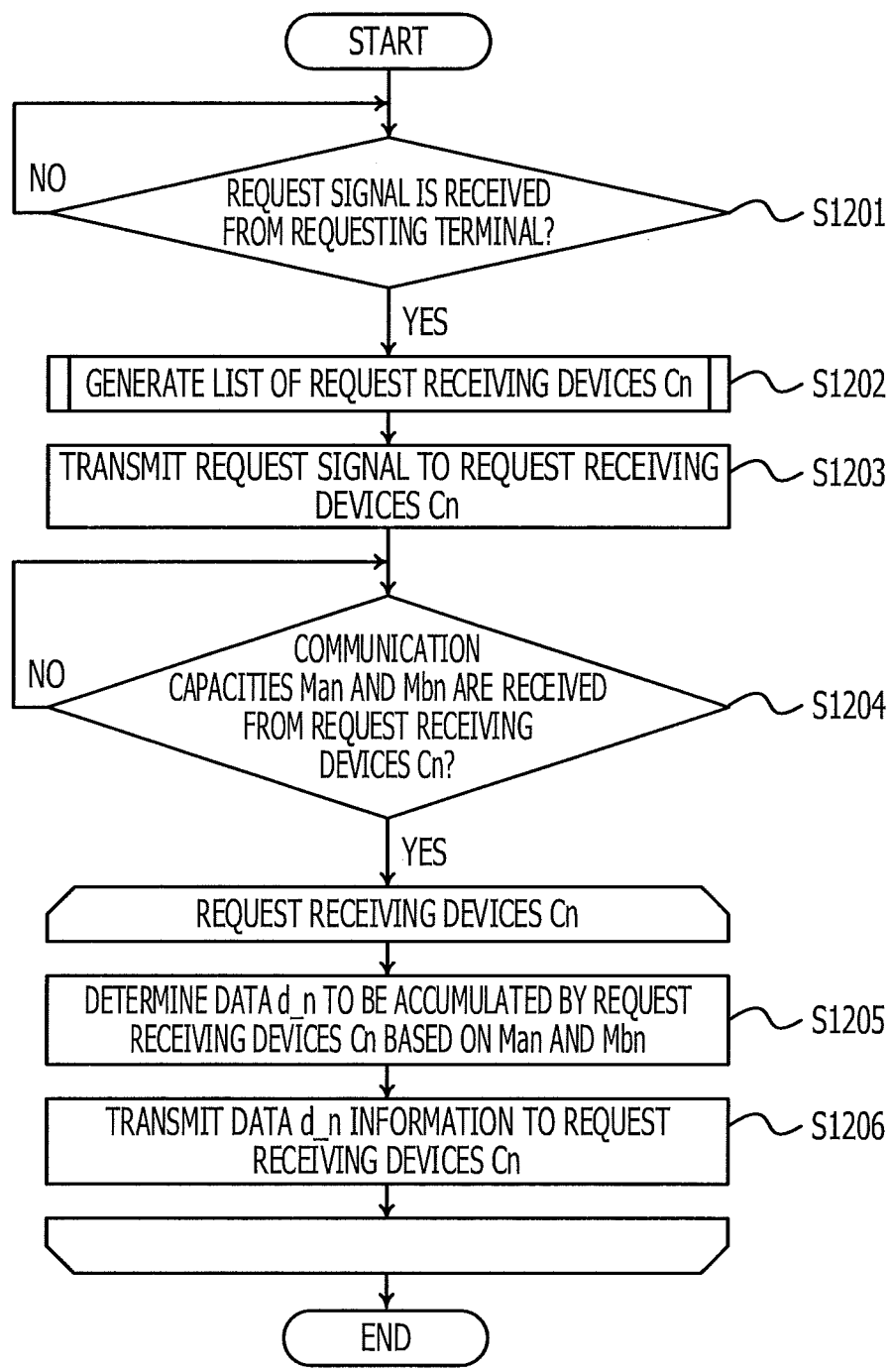
FIG. 12 is a flowchart of an example of a process to be executed by a control terminal according to the third embodiment.

FIG. 12 is a flowchart of an example of a process to be executed by the control terminal according to the third embodiment. The control terminal 901 according to the third embodiment executes steps illustrated in FIG. 12, for example. Steps S1201 to S1203 illustrated in FIG. 12 are the same as steps S501 to S503 illustrated in FIG. 5.

After step S1203, the control terminal 901 determines whether or not the control terminal 901 receives the communication capacities Man and Mbn from the request receiving devices Cn (in step S1204). The control terminal 901 waits until the control terminal 901 receives the communication capacities Man and Mbn (No in step S1204). When receiving the communication capacities Man and Mbn (Yes in step S1204), the control terminal 901 executes the following steps S1205 and S1206 on the request receiving devices Cn indicated in the list generated in step S1202.

The control terminal 901 determines the data d_n to be accumulated by the target request receiving devices Cn based on the communication capacities Man and Mbn received in step S1204 (in step S1205). The control terminal 901 transmits, to the target request receiving devices Cn, the data d_n information indicating the data d_n determined in step S1205 (in step S1206) and terminates the process executed on the target request receiving device Cn.

After executing steps S1205 and S1206 on the request receiving devices Cn indicated in the list generated in step S1202, the control terminal 901 terminates the process.

Process of Request Receiving Devices According to Third Embodiment

Figure 13:
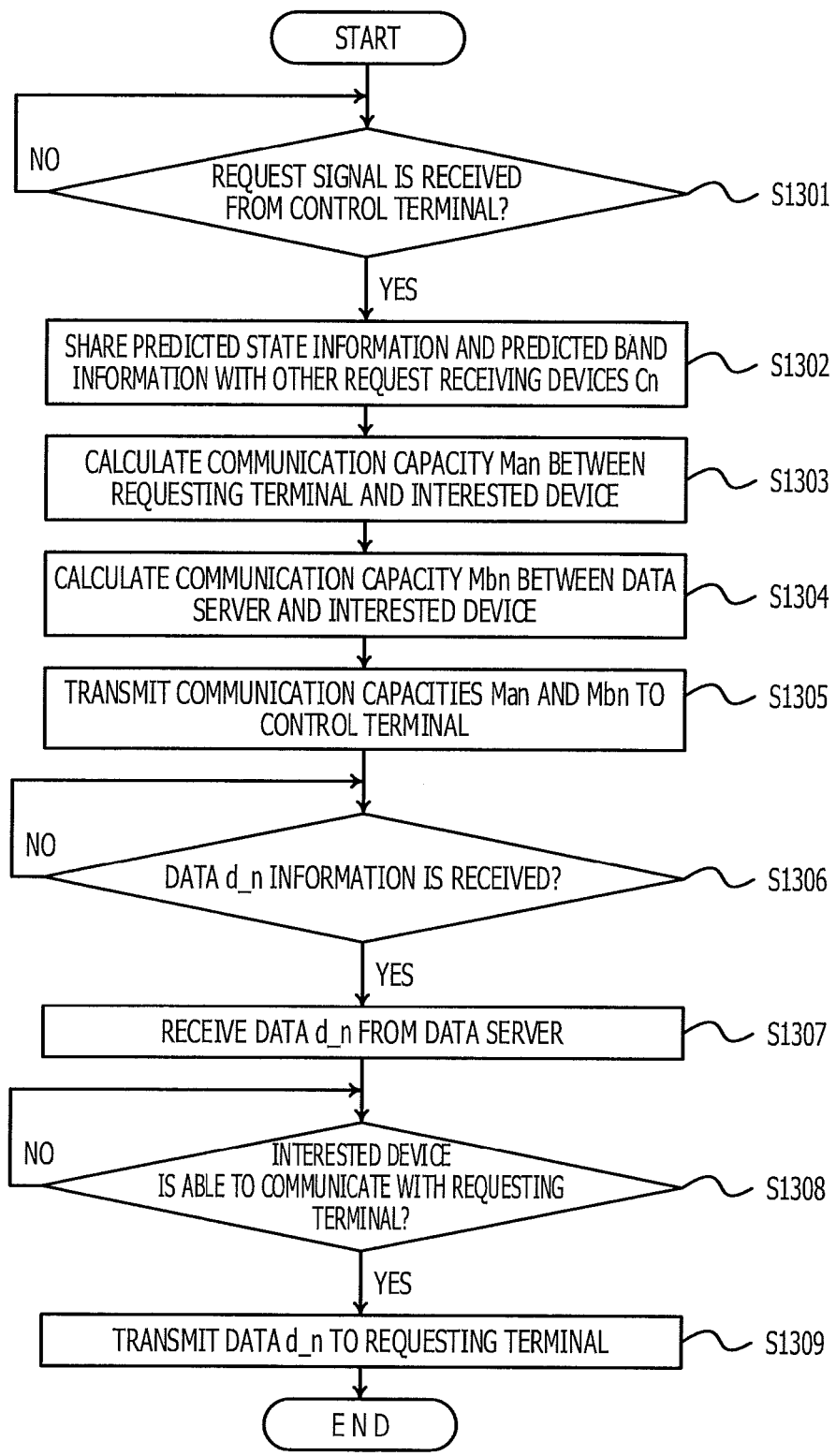
FIG. 13 is a flowchart of an example of a process to be executed by each of the request receiving devices according to the third embodiment.

FIG. 13 is a flowchart of an example of a process to be executed by each of the request receiving devices according to the third embodiment. The request receiving devices Cn (request receiving devices 221 to 224) each execute steps illustrated in FIG. 13, for example. First, the request receiving devices Cn determine whether or not the request receiving devices Cn each receive a request signal from the control terminal 901 (in step S1301). The request receiving devices Cn wait until the request receiving devices Cn receive the request signal (No in step S1301).

When receiving the request signal (Yes in step S1301), each of the request receiving devices Cn share, with the other request receiving devices Cn, predicted state information and predicted band information that are based on predicted route information included in the request signal received (in step S1302). In this case, each of the request receiving devices Cn may share the predicted state information and the predicted band information by communicating with the other request receiving devices Cn.

Then, each of the request receiving devices Cn calculates a communication capacity Man between the requesting terminal 210 and the interested request receiving device Cn based on the predicted state information shared in step S1302 (in step S1303). In addition, each of the request receiving devices Cn calculates a communication capacity Mbn between the data server 230 and the interested request receiving device Cn based on the predicted band information shared in step S1302 (in step S1304). Note that step S1304 may be executed before step S1303.

Subsequently, the request receiving devices Cn transmit the communication capacities Man and Mbn calculated in steps S1303 and S1304 to the control terminal 901 (in step S1305). Then, the request receiving devices Cn cause the process to proceed to step S1306. Steps S1306 to S1309 illustrated in FIG. 13 are the same as steps S703 to S706 illustrated in FIG. 7.

As described above, according to the third embodiment, functions of the control server 241 according to the second embodiment may be achieved by the control terminal 901. Thus, the receive rate of the requesting terminal 210 may be improved similarly to the second embodiment.

The configuration in which the communication capacities Man and Mbn are calculated by the request receiving devices Cn is described above. The communication capacities Man and Mbn, however, may be calculated by the control terminal 901. In this case, the control terminal 901 collects the predicted state information of the request receiving devices Cn and the predicted band information of the request receiving devices Cn and calculates the communication capacities Man and Mbn of the request receiving devices Cn based on the collected predicted state information and the collected predicted band information.

Fourth Embodiment

Differences between the third embodiment and a fourth embodiment are described below. A configuration of the communication system 200 according to the fourth embodiment is the same as the configuration illustrated in FIG. 9.

Operations of Communication System According to Fourth Embodiment

Figure 14:
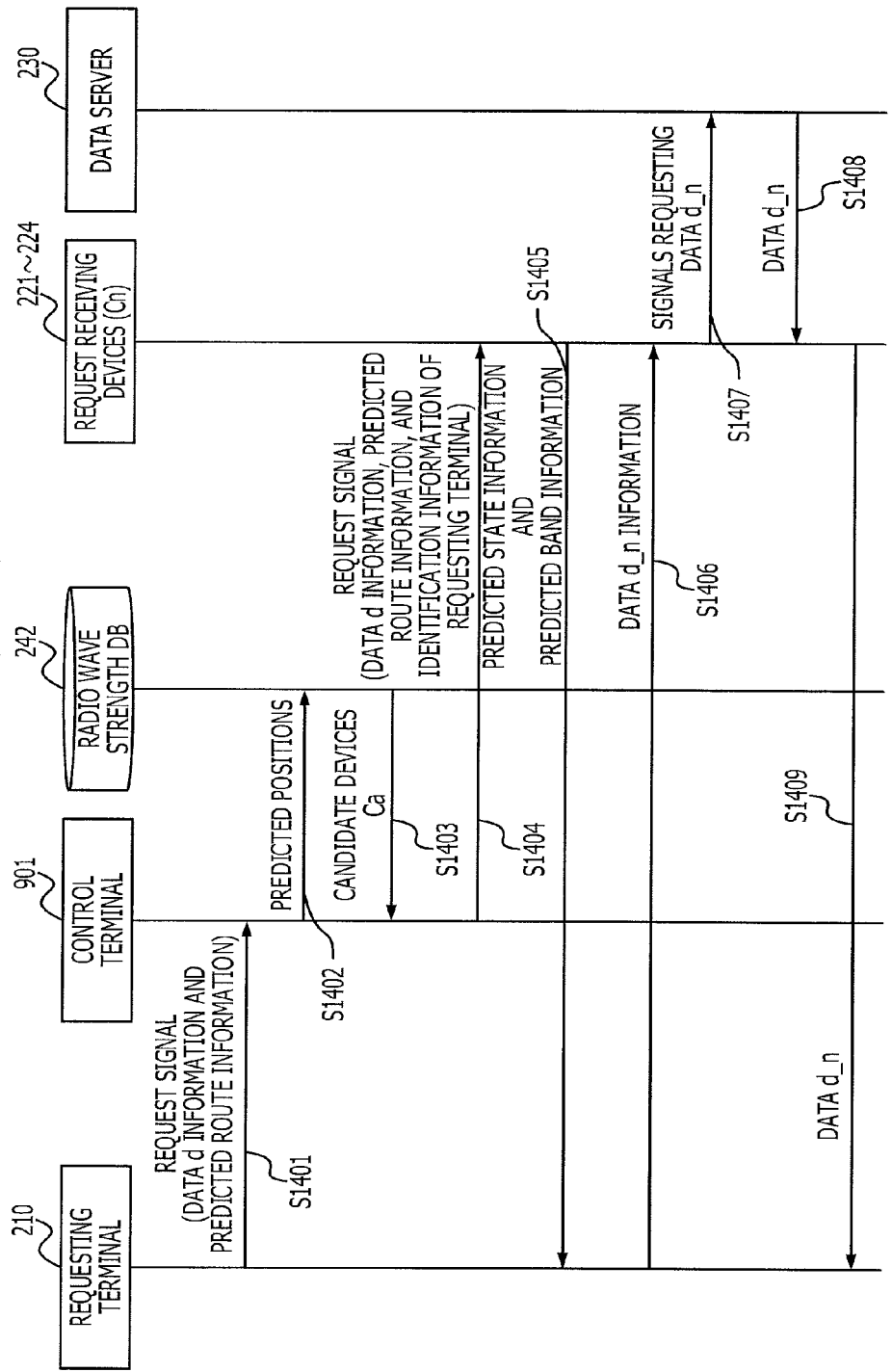
FIG. 14 is a sequence diagram illustrating an example of operations of the communication system according to a fourth embodiment.

FIG. 14 is a sequence diagram illustrating an example of operations of the communication system according to the fourth embodiment. Steps S1401 to S1404 illustrated in FIG. 14 are the same as steps S1001 to S1004 illustrated in FIG. 10.

After step S1404, the request receiving devices Cn transmit, to the requesting terminal 210, the predicted state information and the predicted band information that are based on the predicted route information included in the request signal transmitted in step S1404 (in step S1405). In step S1405, the request receiving devices Cn may transmit the predicted state information and the predicted band information to the requesting terminal 210 through the control terminal 901.

Then, the requesting terminal 210 determines the data d_n to be accumulated by the request receiving devices Cn based on the predicted state information transmitted in step S1405 and the predicted band information transmitted in step S1405. The requesting terminal 210 transmits, to the request receiving devices Cn, the data d_n information indicating the data d_n determined (in step S1406). In step S1406, the requesting terminal 210 transmits the data d_n information to the request receiving devices Cn through the control terminal 901 or another communication device, for example. Steps S1407 to S1409 are the same as steps S1007 to S1009 illustrated in FIG. 10.

Process of Requesting Terminal According to Fourth Embodiment

Figure 15:
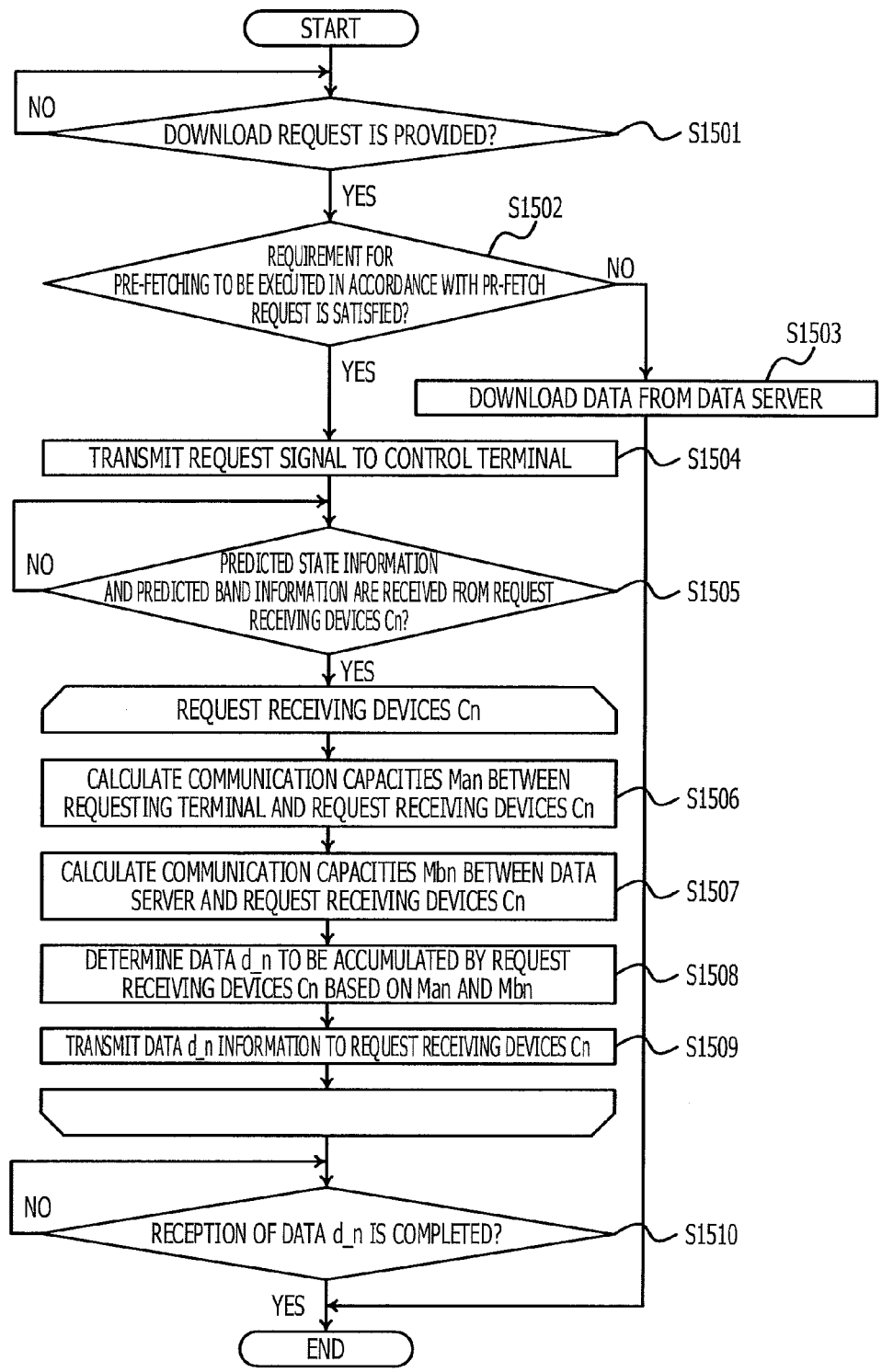
FIG. 15 is a flowchart of an example of a process to be executed by the requesting terminal according to the fourth embodiment.

FIG. 15 is a flowchart of an example of a process to be executed by the requesting terminal according to the fourth embodiment. The requesting terminal 210 according to the fourth embodiment executes steps illustrated in FIG. 15, for example. Steps S1501 to S1504 illustrated in FIG. 15 are the same as steps S1101 to S1104 illustrated in FIG. 11. Steps S1505 to S1509 illustrated in FIG. 15 are the same as steps S504 to S508 illustrated in FIG. 5. The requesting terminal 210, however, executes steps S1506 to S1509 on the request receiving devices Cn from which the predicted state information and the predicted band information are received in step S1505.

After executing steps S1506 to S1509 on the request receiving devices Cn, the requesting terminal 210 causes the process to proceed to step S1510. Specifically, the requesting terminal 210 determines whether or not the requesting terminal 210 completely receives the data d_n from the other communication devices located near the movement route of the requesting terminal 210 (in step S1510). The requesting terminal 210 waits until the requesting terminal 210 receives the data d_n (No in step S1510). When completely receiving the data d_n (Yes in step S1510), the requesting terminal 210 terminates the process.

Process of Control Terminal According to Fourth Embodiment

Figure 16:
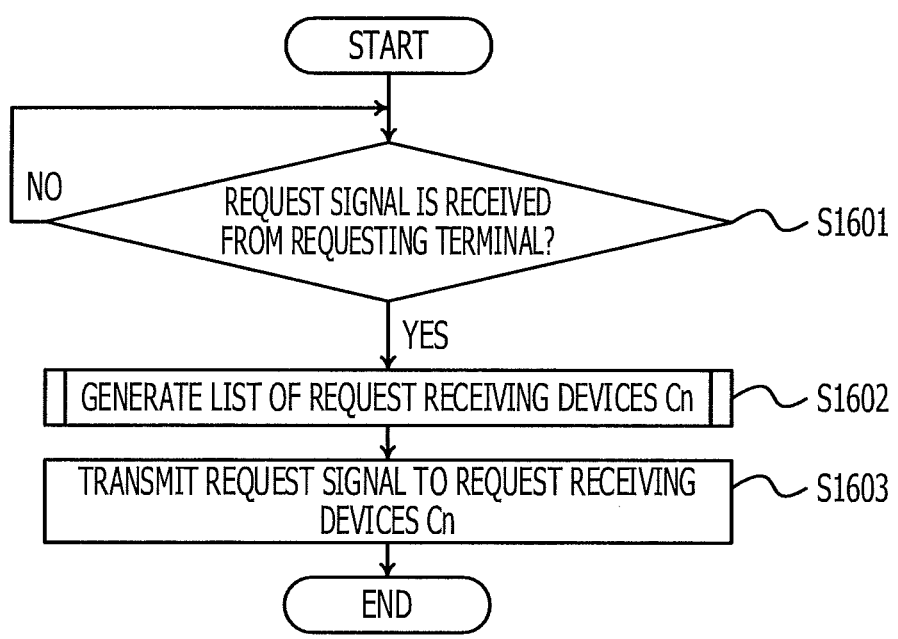
FIG. 16 is a flowchart of an example of a process to be executed by the control terminal according to the fourth embodiment.

FIG. 16 is a flowchart of an example of a process to be executed by the control terminal according to the fourth embodiment. The control terminal 901 according to the fourth embodiment executes steps illustrated in FIG. 16, for example. Steps S1601 to S1603 illustrated in FIG. 16 are the same as steps S501 to S503 illustrated in FIG. 5.

If the request receiving devices Cn transmit the predicted state information and the predicted band information to the requesting terminal 210 through the control terminal 901, the control terminal 901 relays the predicted state information and the predicted band information after steps S1601 to S1603.

Process of Request Receiving Devices According to Fourth Embodiment

Figure 17:
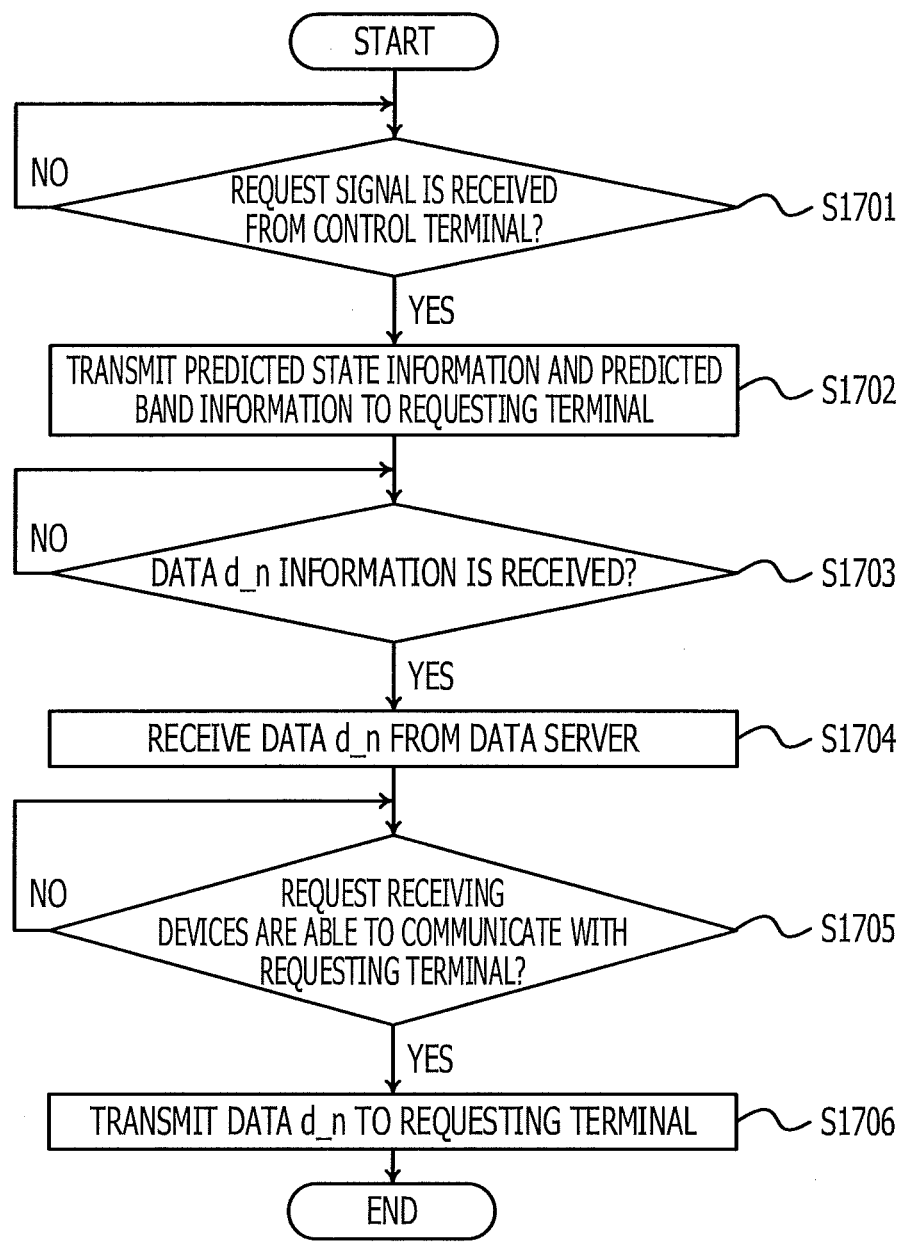
FIG. 17 is a flowchart of an example of a process to be executed by each of the request receiving devices according to the fourth embodiment.

FIG. 17 is a flowchart of an example of a process to be executed by each of the request receiving devices according to the fourth embodiment. The request receiving devices Cn (request receiving devices 221 to 224) according to the fourth embodiment each execute steps illustrated in FIG. 17, for example. First, the request receiving devices Cn determine whether or not the request receiving devices Cn receive the request signal from the control terminal 901 (in step S1701). The request receiving devices Cn wait until the request receiving devices Cn receive the request signal (No in step S1701).

When receiving the request signal (Yes in step S1701), the request receiving devices Cn transmit, to the requesting terminal 210, the predicted state information and the predicted band information that are based on the predicted route information included in the request signal received (in step S1702). In step S1702, the request receiving devices Cn may transmit the predicted state information and the predicted band information to the requesting terminal 210 through the control terminal 901. Then, the request receiving devices Cn cause the process to proceed to step S1703. Steps S1703 to S1706 illustrated in FIG. 17 are the same as steps S703 to S706 illustrated in FIG. 7.

As described above, according to the fourth embodiment, the functions of the control server 241 according to the second embodiment may be achieved by the requesting terminal 210. Thus, the receive rate of the requesting terminal 210 may be improved similarly to the second embodiment.

The configuration in which the control terminal 901 identifies the request receiving devices Cn is described above. The requesting terminal 210, however, may identify the request receiving devices Cn. In this case, the requesting terminal 210 is able to be connected to the radio wave strength DB 242, searches candidate devices Ca from the radio wave strength DB 242 based on the predicted route information of the requesting terminal 210, and identifies the request receiving devices Cn among the searched candidate devices Ca. In this case, the control terminal 901 may be omitted.

Process of Calculating Communication Capacities

Next, a process of calculating the communication capacities Man between the requesting terminal 210 and the request receiving devices Cn and the communication capacities Mbn between the data server 230 and the request receiving devices Cn is described. A case in which the communication capacities Man and Mbn are determined by the control server 241 similarly to the second embodiment is described below.

Figure 18A:
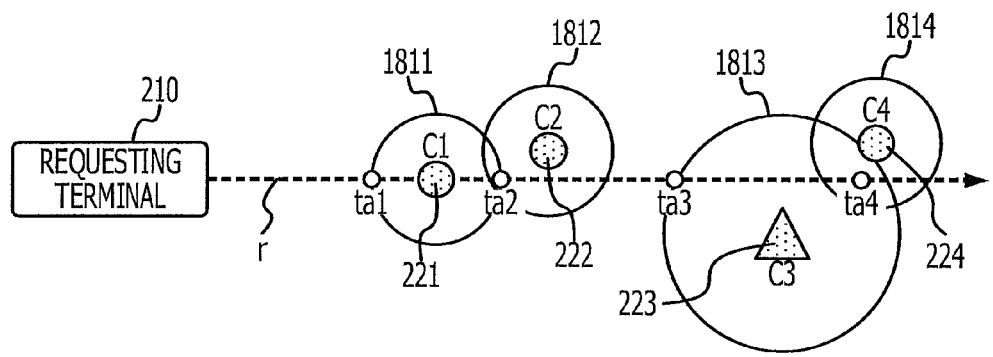
FIG. 18A is a diagram illustrating an example of communication ranges between the requesting terminal and the request receiving devices.

FIG. 18A is a diagram illustrating an example of communication ranges between the requesting terminal and the request receiving devices. Parts that are illustrated in FIG. 18A and the same as the parts illustrated in FIG. 2 are represented by the same reference numerals and symbols as the parts illustrated in FIG. 2, and a description thereof is omitted. Communication ranges 1811 to 1814 are communication ranges for the requesting terminal 210, while the request receiving devices 221 to 224 (C1 to C4) are able to wirelessly communicate with the requesting terminal 210 in the communication ranges 1811 to 1814. Times ta1 to ta4 are predicted times when the requesting terminal 210 enters in the communication ranges 1811 to 1814 on the predicted route r.

Figure 18B:
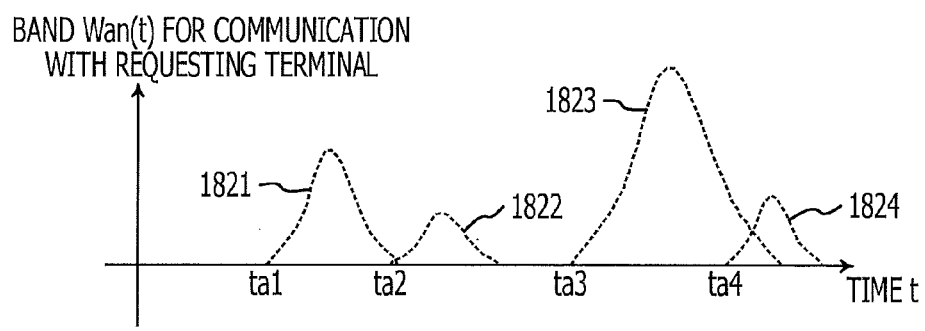
FIG. 18B is a diagram illustrating an example of communication bands between the requesting terminal and the request receiving devices.

FIG. 18B is a diagram illustrating an example of communication bands between the request receiving devices and the requesting terminal. In FIG. 18B, the abscissa indicates time t. Communication bands 1821 to 1824 are communication bands Wan(t) between the requesting terminal 210 and the request receiving devices 221 to 224. The communication bands 1821 to 1824 may be calculated from communication band characteristics of the request receiving devices 221 to 224 and predicted positions of the requesting terminal 210 at times t.

The control server 241 calculates a time tan when the requesting terminal 210 starts to be connected to a request receiving device Cn (or disconnected from a request receiving device Cn−1). The time tan may be calculated as a time when a communication band Wan(t) of the request receiving device Cn becomes higher than a communication band Wan−1(t) of the request receiving device Cn−1. A communication capacity Man between the requesting terminal 210 and the request receiving device Cn may be calculated according to the following Equation (1).

$$Man = \int_{tan}^{tan+1} Wan(t)dt \quad (1)$$

A communication capacity Wbn(t) between the request receiving device Cn and the data server 230 at a time t may be calculated from history records of a communication band used for communication from the request receiving device Cn to the data server 230. A communication capacity Mbn between the request receiving device Cn and the data server 230 may be calculated according to the following Equation (2).

$$Mbn = \int_{tbn}^{tbn+1} Wbn(t)dt \quad (2)$$

A time tbn is a time when the request receiving device Cn starts to be connected to the data server 230 (and the request receiving device Cn−1 is disconnected from the data server 230). A time tb1 is a time when a download request (request signal) is notified by the requesting terminal 210. A time tbn+1 is a time when the communication capacity Mbn of the aforementioned Equation (2) becomes equal to the communication capacity Man and the request receiving device Cn completes download of data with an amount corresponding to the communication capacity Man that enables the data to be transmitted to the requesting terminal 210. It is assumed that an upper limit of the time tbn+1 is the time tan.

Thus, the request receiving device Cn starts communicating with the data server 230 when the request receiving device Cn−1 terminates the communication with the data server 230. The request receiving device Cn terminates the communication with the data server 230 at the time tan when the request receiving device Cn starts communicating with the requesting terminal 210 or when the request receiving device Cn completes the download of the data with the amount corresponding to the communication capacity Man from the data server 230.

If the request receiving device Cn is a terminal that is able to download the data from the data server 230 and communicate with the requesting terminal 210 simultaneously, the request receiving device Cn may continue to download the data after the time tan. If a plurality of request receiving devices are connected to the data server 230 simultaneously, and bands are not reduced, the time tbn may be earlier.

Process of Determining Data to be Received by Request Receiving Devices

Next, a process of determining data to be received by the request receiving devices Cn is described. A case in which data to be received by the request receiving devices Cn is determined by the control server 241 similarly to the second embodiment is described below.

The control server 241 determines a total number N of request receiving devices Cn so that the following Formula (3) is satisfied. It is assumed that the total amount of the data d is M.

$$\Sigma_{n=1}^{N} Mn \geq M, \text{ but } Mn = \min(Man, Mbn) \quad (3)$$

Then, the control server 241 determines amounts Dn of data to be accumulated by the request receiving devices Cn so that the following Inequality (4) and Equation (5) are satisfied.

$$Dn \leq Mn \quad (4)$$

$$\Sigma_{n=1}^{N} Dn = M \quad (5)$$

For example, the control server 241 determines the amounts Dn of the data to be accumulated by the request receiving devices Cn according to the following Equation (6).

$$Dn = \frac{M \cdot Mn}{\sum_{n=1}^{N} Mn} \quad (6)$$

Figure 19:
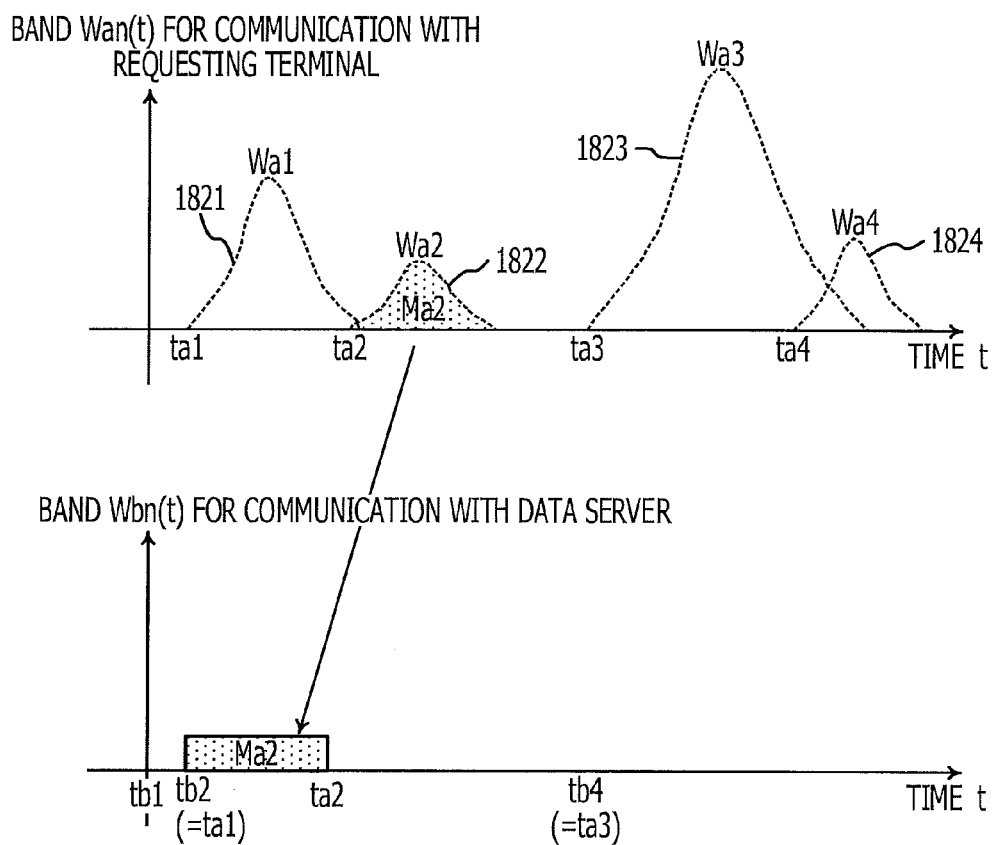
FIG. 19 is a diagram illustrating an example of times to start a connection.

FIG. 19 is a diagram illustrating an example of times when a connection starts. Reference numerals that are illustrated in FIG. 19 and the same as those illustrated in FIG. 18B represent the same parts as those illustrated in FIG. 18B, and a description thereof is omitted. Data d_2 to be received by the request receiving device 222 (C2) is described below. As illustrated in FIG. 19, a communication capacity Mat between the requesting terminal 210 and the request receiving device 222 (C2) may be represented as an integral of the communication band 1822.

The request receiving device 222 (C2) starts receiving the data d_2 from the data server 230 at a time tb2. In the example illustrated in FIG. 19, the time tb2 is the same as the time ta1 when the communication between the request receiving device 221 (C1) and the requesting terminal 210 starts. The request receiving device 222 (C2) completes the reception of the data d_2 from the data server 230 before the time ta2 when the request receiving device 222 (C2) becomes able to communicate with the requesting terminal 210.

It is assumed that bands for communication from the data server 230 to the request receiving devices 221 to 224 (C1 to C4) are 3 Mbps. In addition, it is assumed that the size of the data d requested by the requesting terminal 210 is 40 megabits.

Figure 20:
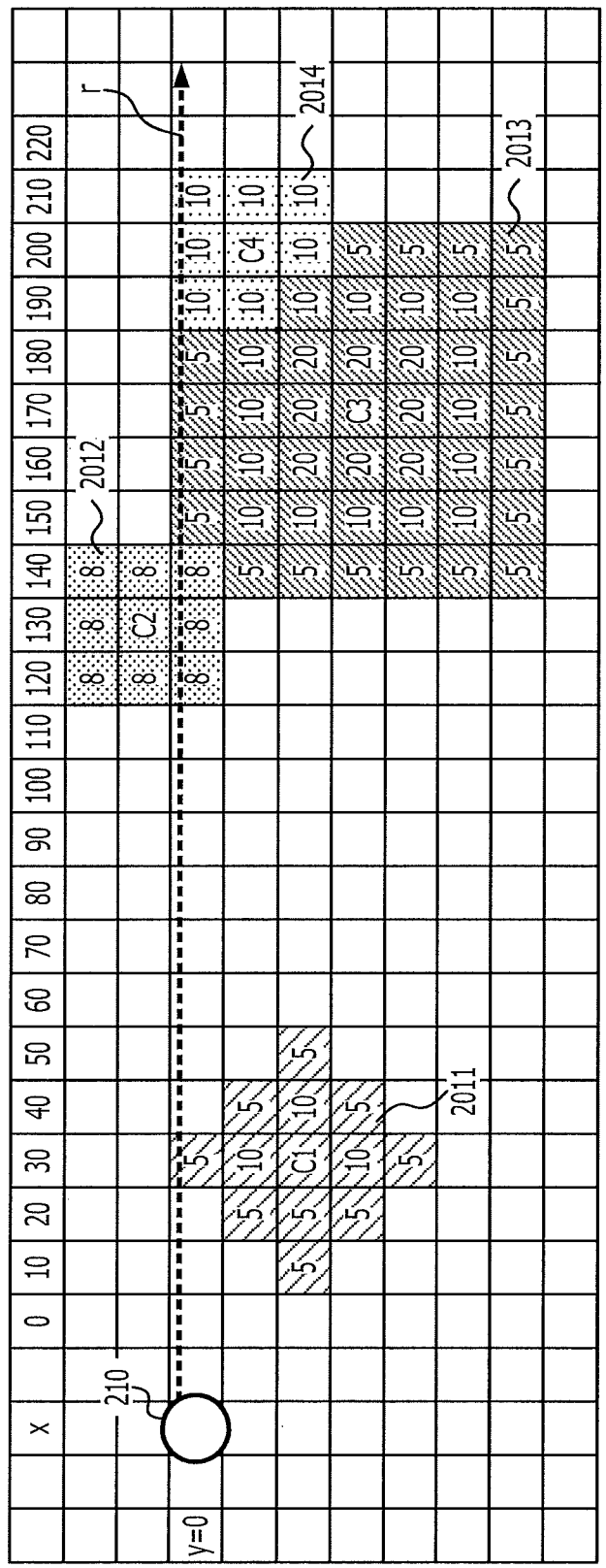
FIG. 20 is a diagram schematically illustrating an example of the positions of the devices and strength of radio waves of the devices.

FIG. 20 is a diagram schematically illustrating an example of positions of the devices and strength of radio waves. Each of cells illustrated in FIG. 20 represents a region of 10 meters×10 meters. In the example illustrated in FIG. 20, a y coordinate of the predicted route r of the requesting terminal 210 is 0 and an x coordinate of the predicted route r when a time t=0 is 0. It is assumed that x coordinates represent the route on which the terminal moves in a positive direction at a speed of 10 meters per second. Time t is represented by seconds, while a current time is 0, for example.

Communication ranges 2011 to 2014 are communication ranges for the requesting terminal 210, while the request receiving devices 221 to 224 (C1 to C4) are able to wirelessly communicate with the requesting terminal 210 in the communication ranges 2011 to 2014. Numbers within cells of the communication ranges 2011 to 2014 represent communication bands (Mbps).

Figure 21:
FIG. 21 is a diagram illustrating an example of predicted route information.

FIG. 21 is a diagram illustrating an example of the predicted route information. In a state illustrated in FIG. 20, the requesting terminal 210 transmits predicted route information 2100 illustrated in FIG. 21 to the control server 241, for example. The predicted route information 2100 indicates coordinates of predicted positions of the requesting terminal 210 at times t. In the example illustrated in FIG. 21, the predicted positions are represented by only x coordinates, and y coordinates of the predicted positions are omitted. The predicted route information 2100 indicates that x and y coordinates of a predicted position of the requesting terminal 210 three seconds after the current time are 30 and 0, respectively.

FIG. 22 is a diagram illustrating an example of a communication-enabled device table. In the state illustrated in FIG. 20, a communication-enabled device table 2200 illustrated in FIG. 22 is generated in the wave radio strength DB 242, for example. The communication-enabled device table 2200 represents, for the positions, IDs (candidate device IDs) of candidate devices that are able to communicate with the requesting terminal 210. In the example illustrated in FIG. 22, only x coordinates of the positions are illustrated, and y coordinates of the positions are omitted.

The communication-enabled device table 2200 indicates that the request receiving device 221 (C1) is able to wirelessly communicate with the requesting device 210 located at the position whose x and y coordinates are 30 and 0, respectively. In addition, the communication-enabled device table 2200 indicates that the request receiving devices 222 and 223 (C2 and C3) are able to wirelessly communicate with the requesting device 210 located at a position whose x and y coordinates are 150 and 0, respectively.

Figure 23:
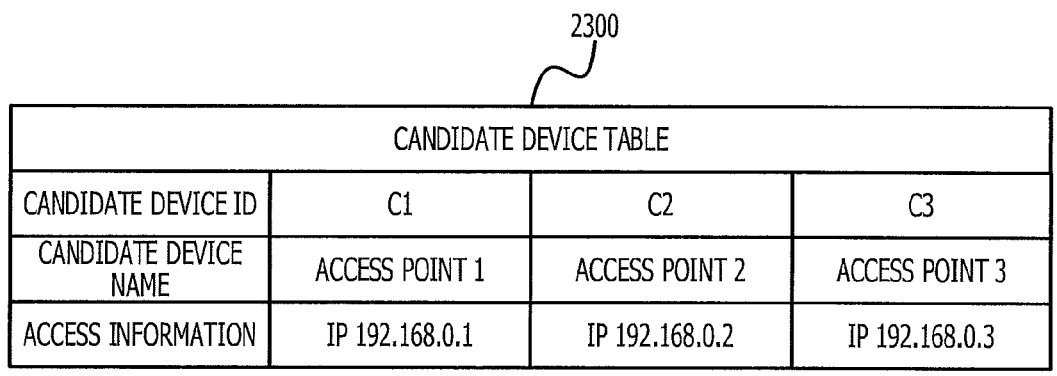
FIG. 23 is a diagram illustrating an example of a candidate device table.

FIG. 23 is a diagram illustrating an example of a candidate device table. In the state illustrated in FIG. 20, a candidate device table 2300 illustrated in FIG. 23 is generated in the radio wave strength DB 242, for example. The candidate device table 2300 is information that indicates candidate device IDs, candidate device names, and access information for candidate devices for the request receiving devices Cn that are able to wirelessly communicate with the requesting device 210. The access information is IP addresses, for example.

Figure 24:
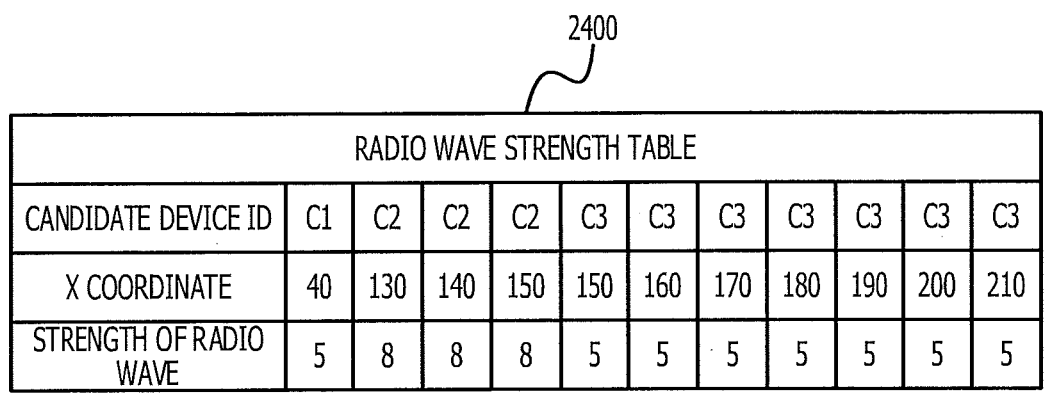
FIG. 24 is a diagram illustrating an example of a radio wave strength table.

FIG. 24 is a diagram illustrating an example of a radio wave strength table. In the state illustrated in FIG. 20, a radio wave strength table 2400 illustrated in FIG. 24 is generated in the radio wave strength DB 242, for example. The radio wave strength table 2400 is information that indicates the candidate device IDs, positions (only x coordinates in the example illustrated in FIG. 24) of the candidate devices, and strength (Mbps) of radio waves for the candidate devices for the request receiving devices Cn that are able to wirelessly communicate with the requesting device 210.

Figure 25:
FIG. 25 is a diagram illustrating an example of predicted state information.

FIG. 25 is a diagram illustrating an example of the predicted state information. In the state illustrated in FIG. 20, the candidate devices for the request receiving devices Cn transmit predicted state information such as predicted state information 2500 illustrated in FIG. 25 to the control server 241, for example. FIG. 25 illustrates the predicted state information 2500 of the request receiving device 224 (C4). The predicted state information 2500 illustrated in FIG. 25 indicates a communication band characteristic of the request receiving device 224 (C4), the position (only an x coordinate in the example illustrated in FIG. 25) of the request receiving device 224 (C4), and predicted route information for the request receiving device 224 (C4).

The communication band characteristic indicates strength (Mbps) of a radio wave at each position of the request receiving device 224 (C4). In the example illustrated in FIG. 25, the predicted state information 2500 indicates that the strength of a radio wave of the request receiving device 224 (C4) is 10 Mbps in a region whose a y coordinate is 0 and whose x coordinates are in a range of 200 to 220. In addition, the predicted state information 2500 indicates that the request receiving device 224 (C4) is currently located at a position whose x and y coordinates are 210 and 0, respectively.

The predicted route information of the predicted state information 2500 is the same as the predicted route information of the requesting terminal 210, for example. In the example illustrated in FIG. 25, the predicted route information of the predicted state information 2500 indicates that x and y coordinates of a predicted position of the request receiving device 224 (C4) at times 0 to 1000 are 210 and 0, respectively.

The control server 241 first acquires the predicted route information 2100 from the requesting terminal 210 and notifies the radio wave strength DB 242 of the predicted positions, indicated by the acquired predicted route information 2100, of the requesting terminal 210 at the times t. The radio wave strength DB 242 extracts information indicating the request receiving devices 221 to 223 (C1 to C3) based on the communication-enabled device table 2200, the radio wave strength table 2400, and the predicted positions, notified by the control server 241, of the requesting terminal 2100 at the times t.

Then, the radio wave strength DB 242 transmits, to the control server 241, the candidate device table 2300 as the extracted information indicating the request receiving device 221 to 223 (C1 to C3). The control server 241 confirms, based on the candidate device table 2300, whether or not the control server 241 is able to communicate with the request receiving device 221 to 223. In this case, it is assumed that the control server 241 is able to communicate with the request receiving device 221 to 223.

The control server 241 inquires of the request receiving devices 221 to 223 about a device that is communicating with at least one of the request receiving devices 221 to 223 by ad-hoc communication. It is assumed that the request receiving device 224 is communicating with the request receiving device 223 by ad-hoc communication. In this case, the control server 241 transmits a request signal to the request receiving devices 221 to 224.

Next, a specific example of calculation of the times ta and tb and the amounts Dn of the data is described. It is assumed that communication capacities Wb1 to Wb4 between the request receiving devices 221 to 224 and the data server 230 are 3 Mbps.

Figure 26:
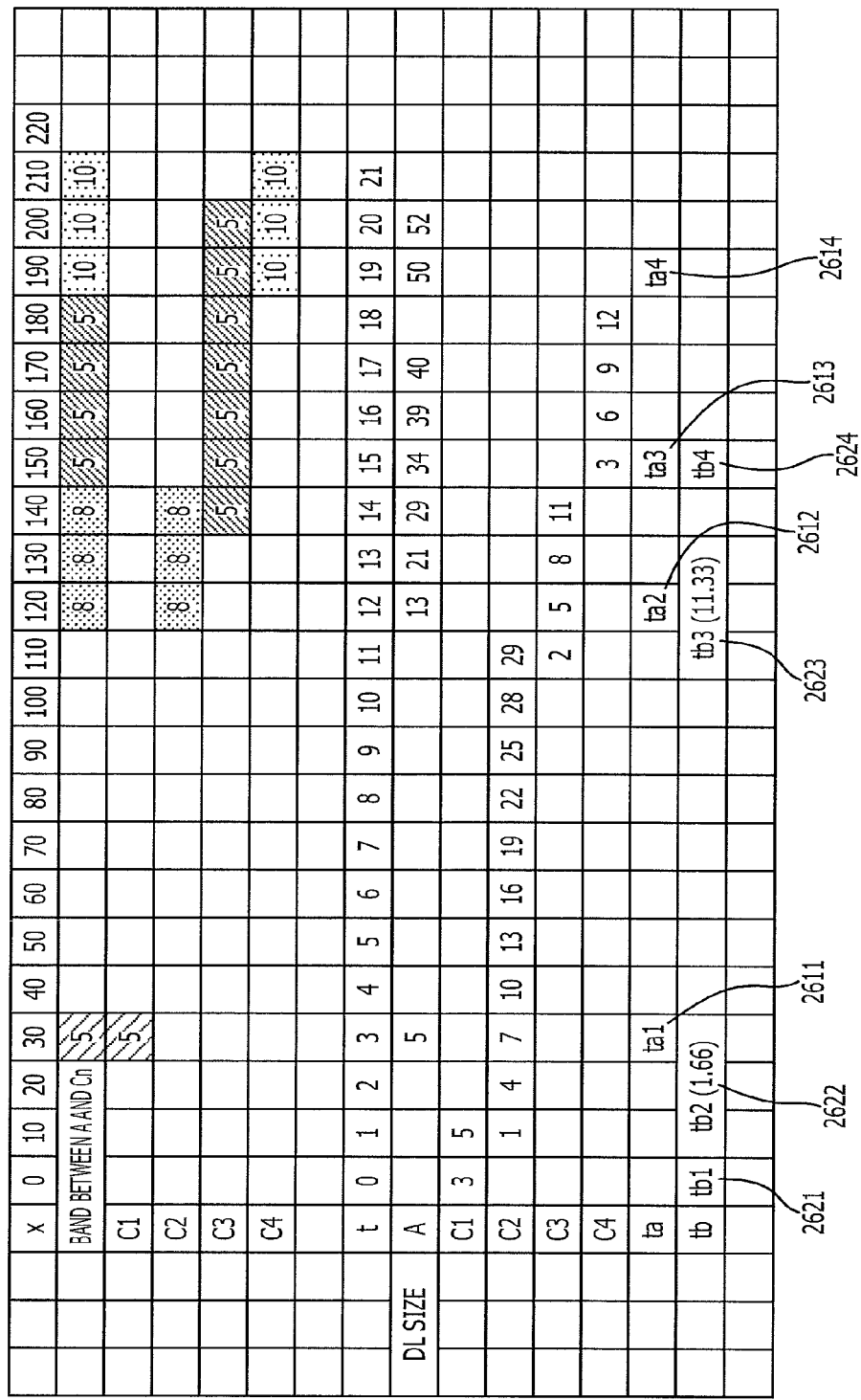
FIG. 26 is a diagram illustrating an example of calculation of times according to the second embodiment.

FIG. 26 is a diagram illustrating an example of the calculation of the times ta and tb according to the second embodiment. In the second embodiment, in the example illustrated in FIG. 20, the times ta1 to ta4 when the requesting terminal 210 (A) starts to be connected to the request receiving devices 221 to 224 are times t=3, 12, 15, and 19, respectively, as represented by reference numerals 2611 to 2614, for example. In addition, as represented by reference numerals 2621 to 2624, times tb1 to tb4 when the request receiving devices 221 to 224 starts to be connected to the data server 230 are times t=0, 1.66, 11.33, and 15, for example.

Figure 27:
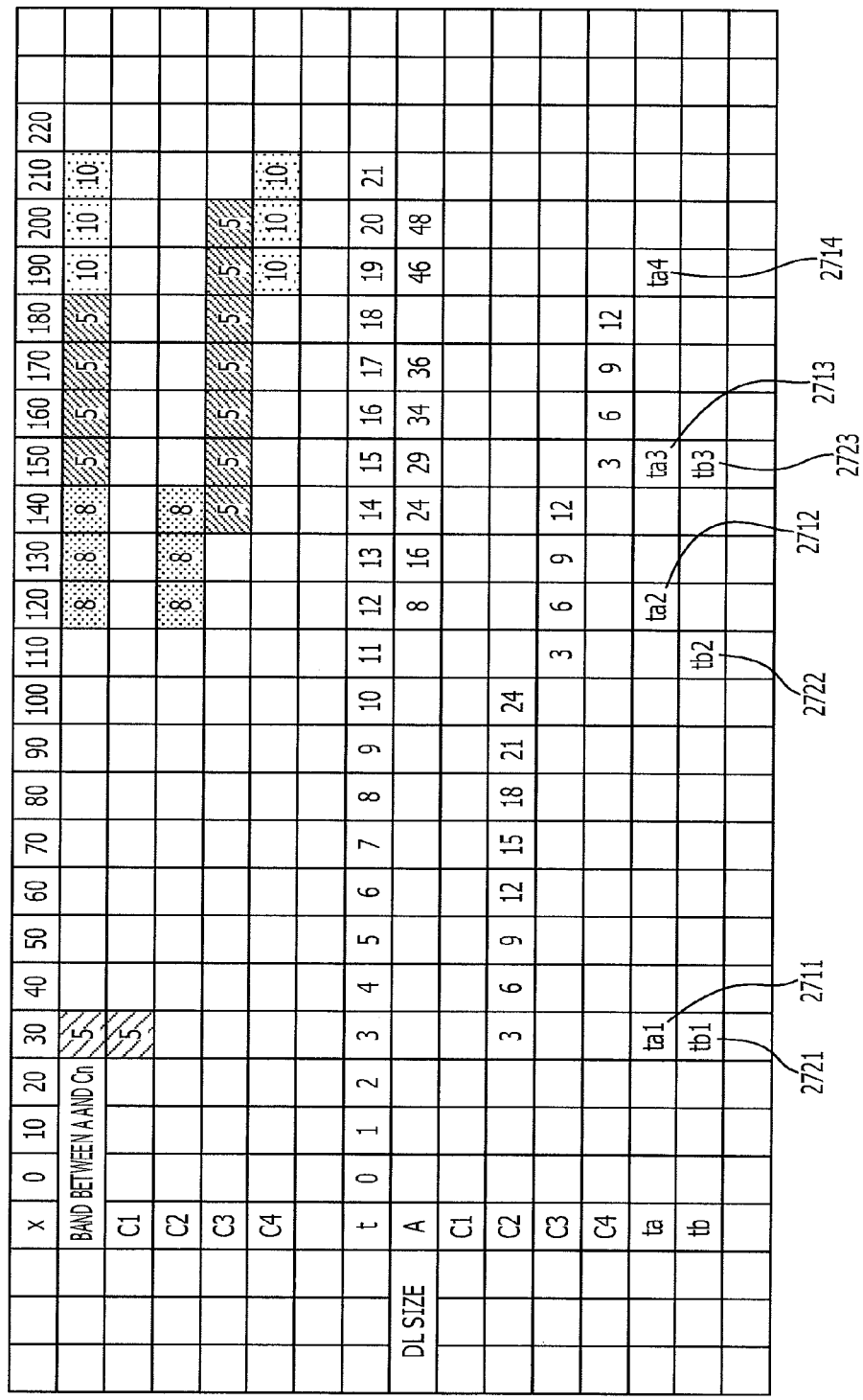
FIG. 27 is a diagram illustrating an example of calculation of times according to the third and fourth embodiments.

FIG. 27 is a diagram illustrating an example of calculation of the times ta and tb according to the third and fourth embodiments. The example of the third and fourth embodiments assumes that the request receiving devices Cn are the control terminal 901 and the request receiving devices 221 to 223. In the third and fourth embodiments, as represented by reference numerals 2711 to 2714, times ta1 to ta4 when the requesting terminal 210 starts to be connected to the control terminal 901 and the request receiving devices 221 to 223 are times t=3, 12, 15, and 19, respectively, for example. In addition, as represented by reference numerals 2721 to 2723, times tb1 to tb3 when the request receiving devices 221 to 223 start to be connected to the data server 230 are times t=3, 11, and 15, respectively, for example.

FIG. 28 is a diagram illustrating an example of calculation of the amounts Dn of the data according to the second embodiment. If the size M of the data requested by the requesting terminal 210 is 40 megabits, M, Ma, and Mb of the request receiving devices 221 to 224 are represented by reference numeral 2811 according to the aforementioned Equations (1) and (2), Formula (3), Inequality (4), and Equations (5) and (6) in the example illustrated in FIG. 26. Thus, as represented by reference numeral 2812, amounts D1 to D4 of the data to be assigned to and received by the request receiving devices 221 to 224 are 4, 18, 8, and 9 megabits, respectively.

FIG. 29 is a diagram describing an example of calculation of the amounts Dn of the data according to the third and fourth embodiments. If the size M of the data d requested by the requesting terminal 210 is 40 megabits, M, Ma, and Mb of the control terminal 901 and request receiving devices 221 to 223 are represented by reference numeral 2911 according to the aforementioned Equations (1) and (2), Formula (3), Inequality (4), and Equations (5) and (6) in the example illustrated in FIG. 27. Thus, as represented by reference numeral 2912, the amounts D1 to D4 of the data to be assigned to and received by the control terminal 901 and the request receiving devices 221 to 223 are 0, 20, 10, and 10 megabits, respectively.

As described above, according to the control method, the control device, and the communication system, it is possible to inhibit communication bands between the first communication device 120 (data server 230) and the second communication devices 140 (request receiving devices 221 to 224) from being a bottleneck.

Thus, even if a rate of downloading data from the data server 230 to the mobile terminal 110 and rates of downloading data from the data server 230 to the second communication devices 140 are low, the receive rate of the mobile terminal 110 may be improved.

For example, if the second communication devices 140 are servers located in a country other than Japan, or if access to the second communication devices 140 is concentrated and bands of the second communication devices 140 are limited, communication bands between the first communication device 120 and the second communication devices 140 are narrow. On the other hand, according to the communication systems 100 and 200, it is possible to inhibit the communication bands between the first communication device 120 and the second communication devices 140 from being a bottleneck for reception by the mobile terminal 110.

In addition, by improving the receive rate of the mobile terminal 110, the user-friendliness of the mobile terminal 110 may be improved and power to be consumed by the mobile terminal 110 may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method comprising:
acquiring information that indicates a predicted position of a mobile terminal that requests data that is able to be received from a first communication device;
identifying, based on the acquired information, a second communication device that is able to communicate with the mobile terminal located at the predicted position; and
causing, by a processor, the second communication device to start receiving the data from the first communication device before the identified second communication device becomes able to communicate with the mobile terminal, and to transmit the received data to the mobile terminal after the second communication device becomes able to communicate with the mobile terminal.

2. The control method according to claim 1,
wherein the identifying identifies the second communication device from among a plurality of communication devices that are able to be communicate with the first communication device, based on information indicating ranges in which the plurality of communication devices are able to communicate with the mobile terminal.

3. The control method according to claim 1, further comprising:
identifying a plurality of second communication devices; and
causing each of the identified second communication devices to receive each part of the data from the first communication device.

4. The control method according to claim 3, further comprising
determining the each part of the data, based on information indicating a predicted amount that is able to be transmitted by the each of the second communication devices to the mobile terminal within a time period in which the each of the second communication devices is able to communicate with the mobile terminal.

5. The control method according to claim 4, further comprising
calculating the information indicating the predicted amount, based on information indicating a predicted time period in which the each of the second communication devices is able to communicate with the mobile terminal and information indicating a predicted rate of the communication between the mobile terminal and the each of the second communication devices.

6. The control method according to claim 3, further comprising
determining the each part of the data, based on information indicating a predicted amount that is able to be received by the each of the second communication devices from the first communication device before the each of the second communication devices becomes able to communicate with the mobile terminal.

7. The control method according to claim 6, further comprising calculating the information indicating the predicted amount, based on information indicating a predicted time period until the each of the second communication devices become able to communicate with the mobile terminal and information indicating a predicted rate of communication between the first communication device and the each of the second communication devices.

8. The control method according to claim 1,
wherein the processor is provided in a control server that is able to communicate with the mobile terminal and the second communication device through a network, and the control method is executed by the control server.

9. The control method according to claim 1,
wherein the processor is provided in another mobile terminal that is able to wirelessly communicate with the mobile terminal and the second communication device, and the control method is executed by the another mobile terminal.

10. The control method according to claim 1,
wherein the processor is provided in the mobile terminal and the control method is executed by the mobile terminal.

11. The control method according to claim 1,
wherein the second communication device includes another mobile terminal that is able to wirelessly communicate with the mobile terminal.

12. The control method according to claim 1,
wherein the second communication device includes a wireless local area network access point that is able to be wirelessly connected to the mobile terminal.

13. A control device comprising:
a memory; and
a processor coupled to the memory and configured to:
  acquire information indicating a predicted position of a mobile terminal that requests data that is able to be received from a first communication device,
  identify, based on the acquired information, a second communication device that is able to communicate with the mobile terminal located at the predicted position,
  cause the second communication device to start receiving the data from the first communication device before the identified second communication device becomes able to communicate with the mobile terminal, and
  cause the second communication device to transmit the received data to the mobile terminal after the second communication device becomes able to communicate with the mobile terminal.

14. A communication system comprising:
a mobile terminal configured to request data that is able to be received from a first communication device;
a second communication device configured to communicate with the mobile terminal located at a predicted position; and
a control device configured to:
  identify the second communication device based on information indicating the predicted position of the mobile terminal,
  cause the second communication device to start receiving the data from the first communication device before the identified second communication device becomes able to communicate with the mobile terminal, and
  cause the second communication device to transmit the received data to the mobile terminal after the second communication device becomes able to communicate with the mobile terminal.

* * * * *